US011687962B2

(12) United States Patent
Zheleva et al.

(10) Patent No.: US 11,687,962 B2
(45) Date of Patent: *Jun. 27, 2023

(54) INCENTIVIZING SHARING IN SOCIAL NETWORKS

(71) Applicant: LivingSocial, Inc., Washington, DC (US)

(72) Inventors: Elena Zheleva, Washington, DC (US); Joseph John Pfeiffer, III, Lafayette, IN (US)

(73) Assignee: LIVINGSOCIAL, INC., Washington, DC (US)

( * ) Notice: Subject to any disclaimer, the term of this patent is extended or adjusted under 35 U.S.C. 154(b) by 53 days.

This patent is subject to a terminal disclaimer.

(21) Appl. No.: 17/447,452

(22) Filed: Sep. 13, 2021

(65) Prior Publication Data

US 2022/0067772 A1    Mar. 3, 2022

Related U.S. Application Data

(63) Continuation of application No. 16/659,751, filed on Oct. 22, 2019, now Pat. No. 11,157,932, which is a (Continued)

(51) Int. Cl.
G06Q 30/02 (2023.01)
G06Q 30/0214 (2023.01)
G06Q 50/00 (2012.01)

(52) U.S. Cl.
CPC ......... *G06Q 30/0214* (2013.01); *G06Q 50/01* (2013.01)

(58) Field of Classification Search
None
See application file for complete search history.

(56) References Cited

U.S. PATENT DOCUMENTS 6,101,484 A    8/2000  Halbert et al.
6,269,343 B1   7/2001  Pallakoff
(Continued)

OTHER PUBLICATIONS

"How does the Me+3 promotion work?", help.livingsocial.com/articles/how-does-the-me-3-promotion-work, and captured on Jul. 27, 2012 at http://web.archive.org/web/20120727022941/http://help.livingsocial.com/articles/how-does-the-me-3-promotion-work?, 4 pages.
(Continued)

*Primary Examiner* — David J Stoltenberg
(74) *Attorney, Agent, or Firm* — Alston & Bird LLP

(57) ABSTRACT

An online incentive network is optimized. Online incentive network data is accessed including data regarding sharing between users of the network from at least one database. Inputted parameters and network data are applied to one or more models for incentivized deal sharing to determine profitability of an incentivized sharing deal to offer to plurality of users via an online network for one or more products or services provided by a merchant. The incentivized sharing deal comprises a deal in which a user purchases a particular deal, and then when the user shares the particular deal with a threshold number of other users who also purchase the deal, the user receives an incentive. The parameters include a price of the deal; a proportion of the deal kept by the merchant or the online incentive network, and the number of incentivized users. An interface offers the incentivized sharing deal to users.

21 Claims, 21 Drawing Sheets

Related U.S. Application Data continuation of application No. 13/966,187, filed on Aug. 13, 2013, now Pat. No. 10,482,487.

(60) Provisional application No. 61/780,006, filed on Mar. 13, 2013, provisional application No. 61/682,602, filed on Aug. 13, 2012.

(56) References Cited

U.S. PATENT DOCUMENTS

| | | |
|---|---|---|
| 6,604,089 B1 | 8/2003 | Van et al. |
| 6,631,356 B1 | 10/2003 | Van et al. |
| 6,876,983 B1 | 4/2005 | Goddard et al. |
| 6,934,690 B1 | 8/2005 | Van et al. |
| 6,985,879 B2 | 1/2006 | Walker et al. |
| 6,996,579 B2 | 2/2006 | Leung et al. |
| 7,107,230 B1 | 9/2006 | Halbert et al. |
| 7,120,592 B1 | 10/2006 | Lewis |
| 7,124,099 B2 | 10/2006 | Mesaros |
| 7,124,107 B1 | 10/2006 | Pishevar et al. |
| 7,146,330 B1 | 12/2006 | Alon et al. |
| 7,181,419 B1 | 2/2007 | Mesaros |
| 7,194,427 B1 | 3/2007 | Van et al. |
| 7,243,082 B1 | 7/2007 | Forlai |
| 7,263,498 B1 | 8/2007 | Van et al. |
| 7,363,246 B1 | 4/2008 | Van et al. |
| 7,467,103 B1 | 12/2008 | Murray et al. |
| 7,480,627 B1 | 1/2009 | Van et al. |
| 7,555,466 B2 | 6/2009 | Eglen et al. |
| 7,593,871 B1 | 9/2009 | Mesaros |
| 7,599,858 B1 | 10/2009 | Grady et al. |
| 7,664,516 B2 | 2/2010 | Levi et al. |
| 7,672,897 B2 | 3/2010 | Chung et al. |
| 8,140,402 B1 | 3/2012 | Mesaros |
| 8,155,679 B2 | 4/2012 | Levi et al. |
| 8,285,598 B2 | 10/2012 | Mesaros |
| 8,494,914 B2 | 7/2013 | Mesaros |
| 8,494,915 B2 | 7/2013 | Mesaros |
| 8,589,247 B2 | 11/2013 | Mesaros |
| 9,280,782 B1 | 3/2016 | George et al. |
| 9,626,689 B1 | 4/2017 | Bethke et al. |
| 10,482,487 B1 | 11/2019 | Zheleva et al. |
| 2001/0029464 A1 | 10/2001 | Schweitzwer |
| 2003/0069785 A1 | 4/2003 | Lohse |
| 2004/0034570 A1 | 2/2004 | Davis |
| 2005/0189415 A1 | 9/2005 | Fano et al. |
| 2005/0273351 A1 | 12/2005 | Chudnovsky et al. |
| 2006/0036497 A1 | 2/2006 | Chickering et al. |
| 2006/0080111 A1 | 4/2006 | Homeier-Beals |
| 2006/0085259 A1 | 4/2006 | Nicholas et al. |
| 2007/0033133 A1 | 2/2007 | Pishevar et al. |
| 2007/0043651 A1 | 2/2007 | Xiao et al. |
| 2007/0121843 A1 | 5/2007 | Atazky et al. |
| 2008/0052169 A1 | 2/2008 | O'Shea et al. |
| 2008/0097826 A1 | 4/2008 | Leach et al. |
| 2008/0126240 A1 | 5/2008 | Banbury et al. |
| 2008/0255966 A1 | 10/2008 | Kopelman et al. |
| 2009/0006375 A1 | 1/2009 | Lax et al. |
| 2009/0198622 A1 | 8/2009 | Temte et al. |
| 2009/0240629 A1 | 9/2009 | Xie et al. |
| 2009/0265242 A1 | 10/2009 | Horvitz et al. |
| 2009/0307145 A1 | 12/2009 | Mesaros |
| 2010/0070346 A1 | 3/2010 | Davis |
| 2010/0076820 A1 | 3/2010 | Davis |
| 2010/0145771 A1 | 6/2010 | Fligler et al. |
| 2010/0257028 A1 | 10/2010 | Hillerbrand |
| 2012/0036001 A1 | 2/2012 | Mesaros |
| 2012/0054010 A1 | 3/2012 | Bouta et al. |
| 2012/0078696 A1 | 3/2012 | Roark |
| 2012/0084128 A1 | 4/2012 | Murphy et al. |
| 2012/0166261 A1* | 6/2012 | Velusamy .......... G06Q 30/0214 |
| | | 705/14.16 |
| 2012/0221382 A1 | 8/2012 | Kidron |
| 2012/0221387 A1 | 8/2012 | Liu et al. |
| 2012/0222050 A1 | 8/2012 | Kidron |
| 2012/0271709 A1 | 10/2012 | Ogawa |
| 2012/0303435 A1* | 11/2012 | Rawat ............... G06Q 30/0226 |
| | | 705/14.27 |
| 2012/0310767 A1 | 12/2012 | Rothschild |
| 2012/0316941 A1* | 12/2012 | Moshfeghi ............ G06Q 30/02 |
| | | 705/14.16 |
| 2012/0323688 A1 | 12/2012 | Mesaros |
| 2013/0005437 A1 | 1/2013 | Bethke et al. |
| 2013/0005474 A1 | 1/2013 | Bethke et al. |
| 2013/0006736 A1 | 1/2013 | Bethke et al. |
| 2013/0030983 A1 | 1/2013 | Fahner |
| 2013/0073366 A1 | 3/2013 | Heath |
| 2013/0073473 A1 | 3/2013 | Heath |
| 2013/0085838 A1 | 4/2013 | Tennenholtz et al. |
| 2013/0197983 A1* | 8/2013 | Vel ..................... G06Q 30/0282 |
| | | 705/14.16 |
| 2013/0197984 A1 | 8/2013 | Bhatt et al. |
| 2013/0246139 A1 | 9/2013 | Hardman et al. |
| 2013/0246185 A1 | 9/2013 | Hardman et al. |
| 2013/0304567 A1 | 11/2013 | Adrien et al. |
| 2013/0311258 A1* | 11/2013 | Srivastava ......... G06Q 30/0207 |
| | | 705/14.2 |
| 2020/0234322 A1 | 7/2020 | Zheleva et al. |

OTHER PUBLICATIONS

Aaron Clauset, Cosma Rohilla Shalizi, M. E. J. Newman, "Power-law distributions in empirical data", SIAM Review, 51(4):661-703, 2009,43 pages.

Albert-laszlo Barabasi, Reka Albert, "Emergence of scaling in random networks", Science, 286:509-512, Oct. 1999, 4 pages.

Aris Anagnostopoulos, George Brova, Evimaria Terzi, "Peer and authority pressure in information-propagation models", in PKDD, 2011, 16 pages.

D. Chakrabarti and C Faloutsos, "Graph Mining: Laws, Tools, and Case Studies. Synthesis Lectures on Data Mining and Knowledge Discovery", Morgan & Claypool Publishers, 2012, Chapters 2, 3, 8, 9, 13, 19, 70 total pages.

Elena Zheleva, Hossam Sharara, and Lise Getoor, "Co-evolution of Social and Affiliation Networks." KDD '09 The 15th ACM SIGKDD International Conference on Knowledge Discovery and Data Mining Paris, France—Jun. 28-Jul. 1, 2009, 9 pages.

Hossam Sharara, William Rand, and Lise Getoor, "Differential Adaptive Diffusion: Understanding Diversity and Learning Whom to Trust in Viral Marketing", Proceedings of the Fifth International AAAI Conference on Weblogs and Social Media, 2011, 8 pages.

Joseph J. Pfeiffer III and Elena Zheleva, "Incentivized Sharing in Social Networks", in VLDB Workshop on Online Social Systems (WOSS), 2012, 6 pages.

Jure Leskovec, Jon Kleinberg, and Christos Faloutsos, "Graphs over Time: Densification Laws, Shrinking Diameters and Possible Explanations", KDD'05, Aug. 21-24, 2005, Chicago, Illinois, 2005, 11 pages.

Jure Leskovec, Lada A. Adamic, and Bernardo A. Huberman, "The Dynamics of Viral Marketing", ACM Trans. Web, 1 (1), Apr. 20, 2007, 46 pages.

Jure Leskovec, Lars Backstrom, Ravi Kumar, Andrew Tomkins, "Microscopic Evolution of Social Networks," in KDD'08, Aug. 24-27, 2008, Las Vegas, Nevada, 2008, 9 pages.

Laura J. Kamish, Qiuping Li, "Optimal Referral Bonuses with Asymmetric Information: Firm-Offered and Interpersonal Incentives", Marketing Science, vol. 29, No. 1, Jan.-Feb. 2010, pp. 108-121.

Mao Ye, Chunyan Wang, Christina Aperjis, Bernardo A. Huberman, and Thomas Sandholm, "Collective Attention and the Dynamics of Group Deals", WWW '12 Companion Proceedings of the 21st international conference companion on World Wide Web, pp. 1205-1212, ACM New York, NY, USA, Nov. 29, 2011, 10 pages.

Matthew Salganik. Peter S. Dodds, and Duncan Watts, "Experimental Study of Inequality and Unpredictability in an Articial Cultural Market", Science, vol. 311(5762):854-856, Feb. 10, 2006 plus Supporting Online Materials, 15 pages.

(56) References Cited

OTHER PUBLICATIONS

Nicole Immorlica and Vahab Mirrokni, "Tutorial: Optimal marketing and Pricing in Social Networks", WWW 2010, Tutorial, April 26-30, in Raleigh, NC, 2010, 2 pages.

Nitin Agarwal, Huan Liu, Lei Tang, Philip S. Yu, "Identifying the influential bloggers in a community", in WSDM 08: Proceedings of the international conference on Web search and web data mining, 2008, 11 pages.

Pedro Domingos, Matt Richardson, "Mining the network value of customers", in Proceedings of the Seventh International Conference on Knowledge Discovery and Data Mining, 2002, 10 pages.

Philippe Galle, Kevin Leyton-Brown, Ilya Mironov, "Incentives for Sharing in Peer-to-Peer Networks", in L. Fiege, G. Mxhl, and U. Wilhelm, editors, Electronic Commerce, vol. 2232 of LNCS, pp. 75-87, Springer, 2001, 18 pages.

Selective Propagation of Social Data in Decentralized Online Social Network, Tandukar et al., International Conference on User Modeling, Adaptation, and Personalization UMAP 2011: Advances in User Modeling pp. 213-224, published 2011.

Silvio Lattanzi and D. Sivakumar, "Affiliation Networks," 41st ACM Symposium on Theory of Computing (STOC 2009) in Bethesda, MD, Jun. 2009, pp. 427-434.

Sinan Aral and Dylan Walker, "Identifying Influential and Susceptible Individuals in Social Networks: Evidence from a Randomized Experiment", Workshop on Information Systems Economics (WISE) 2010, 8 pages.

Theodoros Lappas and Evimaria Terzi, "Daily-Deal Selection for Revenue Maximization", The 21st ACM International Conference on Information and Knowledge Management, 2012, 10 pages.

\* cited by examiner

INCENTIVIZING SHARING IN SOCIAL NETWORKS

CROSS-REFERENCE TO RELATED APPLICATIONS

This application is a continuation of U.S. patent application Ser. No. 16/659,751, filed on Oct. 22, 2019, titled "Incentivizing Sharing in Social Networks," which is a continuation of U.S. patent application Ser. No. 13/966,187, filed on Aug. 13, 2013, titled "Incentivizing Sharing in Social Networks" (now U.S. Pat. No. 10,482,487), which claims the benefit under 35 U.S.C. § 119(e) of U.S. Provisional Application No. 61/682,602, titled "Incentivized Sharing in Social Networks" filed on Aug. 13, 2012 in the U.S. Patent and Trademark Office and U.S. Provisional Application No. 61/780,006, titled "Incentivized Sharing in Social Networks" filed on Mar. 13, 2013 in the U.S. Patent and Trademark Office, each of which are herein incorporated by reference in their entirety for all purposes.

TECHNICAL FIELD

The disclosed subject matter relates to the optimization of sharing in online social networks.

BACKGROUND

As a myriad of websites centered around social media and social networks have appeared online over the last few years, a change in the way people share information with one another has occurred. Companies, such as Facebook, Google, Amazon, and LivingSocial, have created websites where millions of users can communicate and share content with one another. This communication includes writing emails and reviews, maintaining friendships, and sharing photos, music, news, products and services.

In recent years, companies have started to leverage online social media in order to increase awareness and adoption of their products and services. Many companies encourage sharing behavior between individuals. In addition to offering functionality for users to share content, certain companies offer monetary incentives to their customers to invite friends to join their websites. By doing this they utilize users' social networks to rapidly increase the volume of site users. Indeed, viral sharing of content can increase traffic to their websites, potentially resulting in increased revenue through ads or product sales in a process known as viral marketing. To further exploit the benefits of viral marketing, companies can incentivize users by giving them monetary rewards for adopting a new product or service. The majority of viral marketing strategies approach incentivization by concentrating on identifying a relatively small set of individuals with high network values and giving them a discounted or free product, in the hope that they would influence many others to also adopt this product.

For example, an online movie rental company may give $20 to a user whose friend signs up for their service. In addition, the friend receives the first one-month subscription for free. Similarly, another online marketplace for designer items may provide tiered incentives for inviting friends to join and purchase from their company, by giving a $30 credit to a user when 10 friends have joined, $30 more in credit when 25 friends have joined, free shipping when 50 friends have joined, and $25 to the user when a friend makes his or her first $25 purchase.

In contrast to viral marketing strategies, which rely on identifying influential members, companies have recently started to offer all customers monetary incentives to convince their friends to join an online service or adopt a product, but withhold the reward until the incentive goal (e.g., a friend adopting) is completed. By doing this, they utilize users' social networks to rapidly increase the volume of site users.

Besides priming users with incentives for attracting new users, several sites tie monetary incentives into sharing (or recommending) products with new and existing customers and rewarding the recommenders when the referred customers purchase products from the site. For example, users who share a deal with their friends get credit equal to the price of that deal towards future purchases if at least two of their friends buy the recommended deal. A more conservative, but immediately applicable, post-purchase incentive called Me+3 provides that when a user persuades three (or more) friends to purchase a particular deal, the user is refunded their own purchase of the deal.

Such incentives can have measurable impacts on the behavior of users and can be of benefit to both users and companies. For instance, using the above example, a user with only one recommendation recipient in mind may choose to expand the number of recommendations or shares, with the intent of convincing two additional people to purchase the deal and receiving the deal for free. On the other hand, the company can get additional purchasers through these recommendations, and recoup the cost of the free deal, as well as increase profits and grow their potential pool of buyers for future deals.

While such incentives become increasingly more popular among online retailers, if a deal is not properly structured, the company can stand to lose money, which is undesired. In addition, it is often difficult to determine which incentivization works without actually giving the incentivization to users and monitoring the results. However, this again exposes the provider to less the optimal profits or even a loss. Conventional viral marketing strategies approach this problem by concentrating on identifying a relatively small set of individuals with high network values and incentivizing them to adopt a product, in the hope that they would influence many others to also adopt this product. However, this method doesn't guarantee the highest possible or maximum profits or even success.

SUMMARY

In some general aspects, a computer-implemented method of generating an incentivized sharing deal includes: receiving, at a server, a request to generate an incentivized sharing deal for one or more products or services provided by a merchant, wherein the incentivized sharing deal comprises a deal in which a user purchases a particular deal, and then when the user shares the particular deal with a threshold number of other users who also purchase the deal, the user receives an incentive; obtaining, at the server, a plurality of parameters for the incentivized sharing deal, the plurality of parameters comprising a location at which the incentivized sharing deal can be used and an open period for the incentivized sharing deal; determining, based on the plurality of parameters for the incentivized sharing deal, the threshold number of other users that are optimal for the deal such that one or more additional parameters for the incentivized sharing deal are optimized, wherein the one or more additional parameters comprises one or more of revenue from the incentivized sharing deal; profit or profit margin from the incentivized sharing deal, and volume of sales for the incentivized sharing deal; and providing the incentivized sharing deal to a plurality of users via an online network.

The plurality of parameters for the incentivized sharing deal may include one or more of a price for the incentivized sharing deal and a value of the incentivized sharing deal.

The method may further include determining, based on the plurality of parameters for the incentivized sharing deal, a price for the incentivized sharing deal such that the one or more additional parameters for the incentivized sharing deal are optimized.

In another general aspect, a service provider system includes: one or more storage devices configured to store network data including data about user interaction with the service provider system in one or more databases and to store one or more applications configured to implement an incentivized sharing deal; and one or more processing devices configured to access the one or more storage devices including the network data and the one or more applications, and configured to execute the one or more applications causing the processing devices to: receive a request to generate an incentivized sharing deal for one or more products or services provided by a merchant, wherein the incentivized sharing deal comprises a deal in which a user purchases a particular deal, and then when the user shares the particular deal with a threshold number of other users who also purchase the deal, the user receives an incentive; obtain a plurality of parameters for the incentivized sharing deal, the plurality of parameters comprising a location at which the incentivized sharing deal can be used and an open period for the incentivized sharing deal; determine, based on the plurality of parameters for the incentivized sharing deal, the threshold number of other users that are optimal for the deal such that one or more additional parameters for the incentivized sharing deal are optimized, wherein the one or more additional parameters comprises one or more of revenue from the incentivized sharing deal; profit or profit margin from the incentivized sharing deal, and volume of sales for the incentivized sharing deal; and provide the incentivized sharing deal to a plurality of users via an online network.

The plurality of parameters for the incentivized sharing deal may include one or more of a price for the incentivized sharing deal and a value of the incentivized sharing deal.

Based on the plurality of parameters for the incentivized sharing deal, a price for the incentivized sharing deal is determined such that the one or more additional parameters for the incentivized sharing deal are optimized.

In yet another general aspect, a computer implemented method of optimizing an online incentive network includes: accessing online incentive network data including data regarding sharing between users of the network from at least one database; inputting parameters and the network data to one or more processing devices; applying, by one or more of the processing devices, the parameters and the network data to one or more models for incentivized deal sharing to determine profitability of an incentivized sharing deal to offer to plurality of users via an online network for one or more products or services provided by a merchant, wherein the incentivized sharing deal comprises a deal in which a user purchases a particular deal, and then when the user shares the particular deal with a threshold number of other users who also purchase the deal, the user receives an incentive; and providing an online or mobile interface configured to offer the incentivized sharing deal to a plurality of users.

The parameters may include a price of the deal; a proportion of the deal kept by the merchant or the online incentive network, and the number of incentivized users.

The model may include an arrival function configured to determine the number of users entering the network. The model may include an awaken function configured to determine how many existing users purchase a deal. The model may include an incentive function configured to determine how many users are incentivized. The model may include a sharing function configured to determine how many users the incentivized users share the deal with. The model may include a recipient function configured to determine how many recipients of the shared deal purchase the shared deal. The model may include a cost function configured to determine how many users who shared the deal receive the incentive.

In yet another general aspect, an online service provider system configured to optimize an online incentive network includes: one or more storage devices configured to store online incentive network data including data regarding sharing between users of the network; one or more storage devices including one or more applications configured to optimize incentivized deal sharing for one or more products or services provided by a merchant, wherein the incentivized sharing deal comprises a deal in which a user purchases a particular deal, and then when the user shares the particular deal with a threshold number of other users who also purchase the deal, the user receives an incentive; and one or more processing devices configured to: receive one or more input parameters and the network data; apply the parameters and the network data to one or more models for incentivized deal sharing to determine profitability of an incentivized sharing deal to offer to plurality of users via an online network; and provide an online or mobile interface configured to offer the incentivized sharing deal to a plurality of users.

The parameters may include: a price of the deal; a proportion of the deal kept by the merchant or the online incentive network; and the number of incentivized users.

The model may include an arrival function configured to determine the number of user entering the network. The model may include an awaken function configured to determine how many existing users purchase a deal.

The model may include: an incentive function configured to determine how many users are incentivized; a sharing function configured to determine how many users the incentivized users share the deal with; a recipient function configured to determine how many recipients of the shared deal purchase the shared deal; and a cost function configured to determine how many users who shared the deal receive the incentive.

The details of various embodiments are set forth in the accompanying drawings and the description below. Other features and advantages will be apparent from the following description, the drawings, and the claims.

DRAWING DESCRIPTION

Figure 15A:
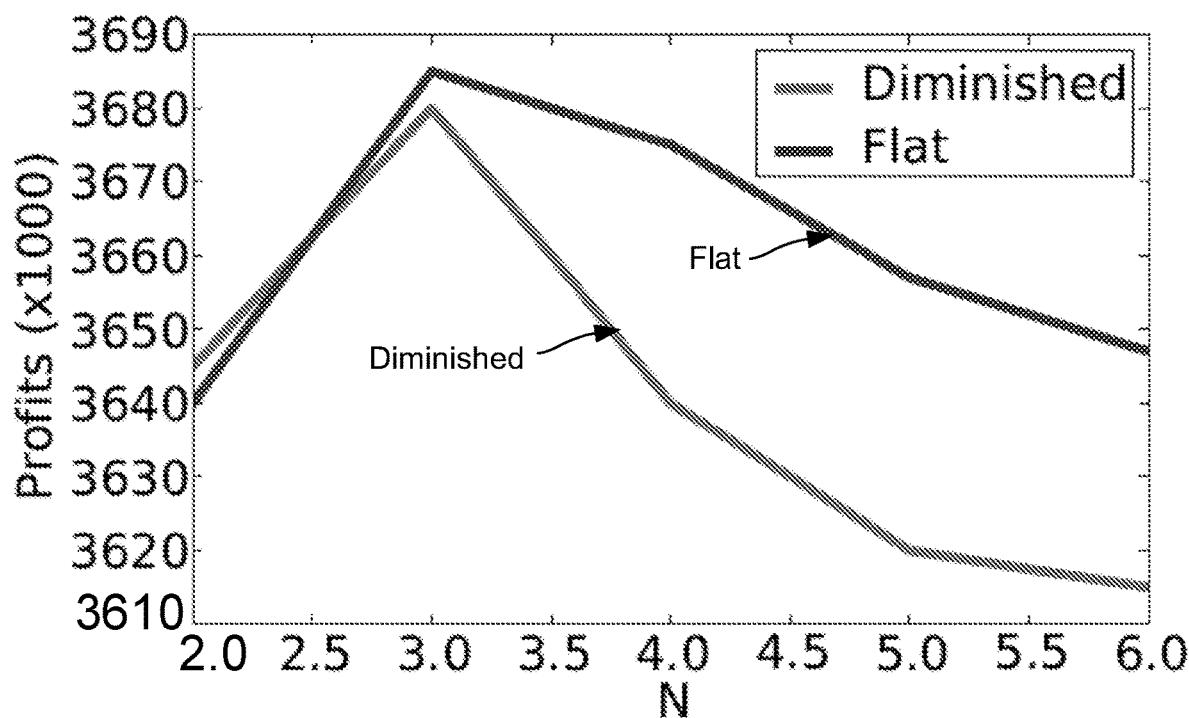
Figure 15B:
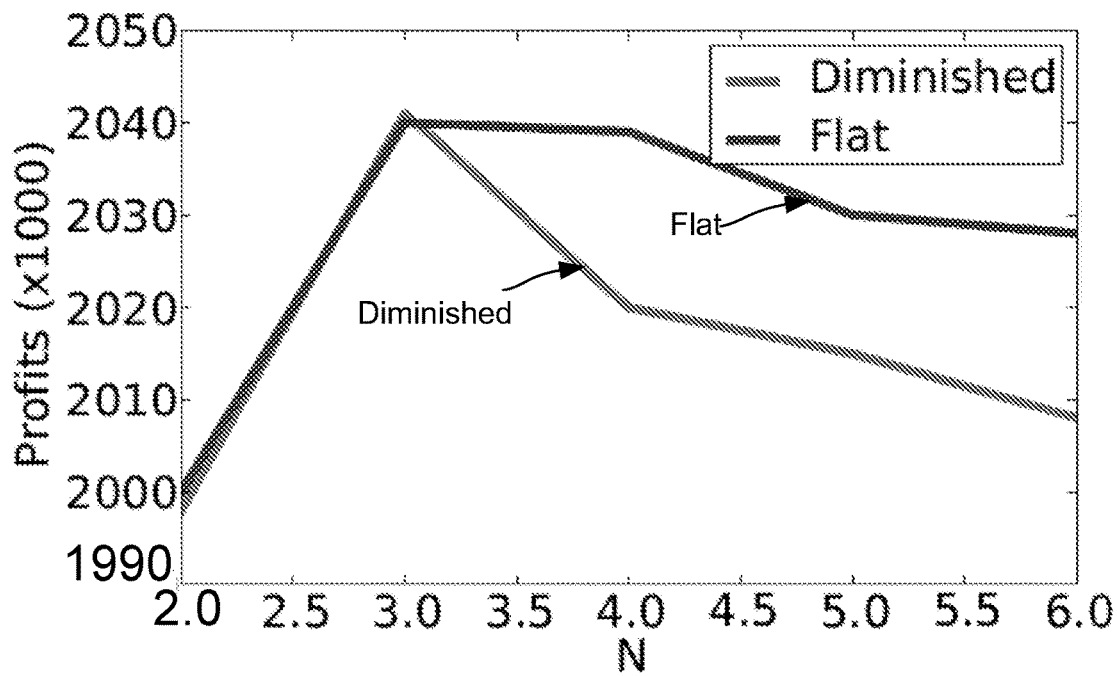
Figure 15C:
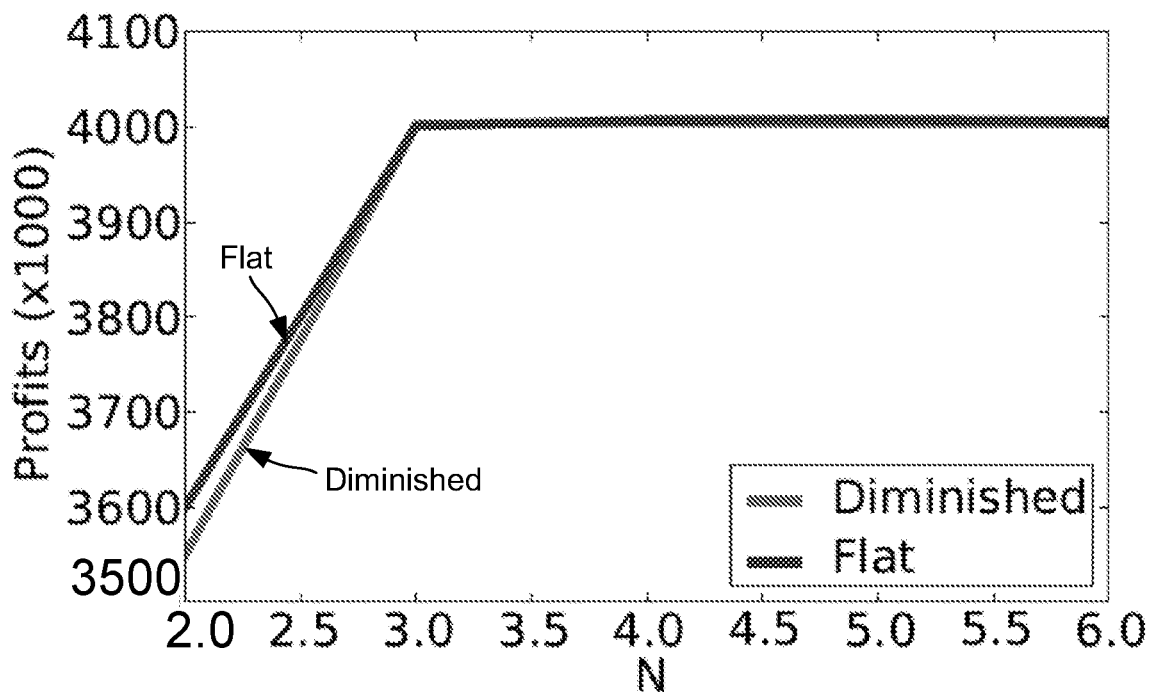
Figure 15D:
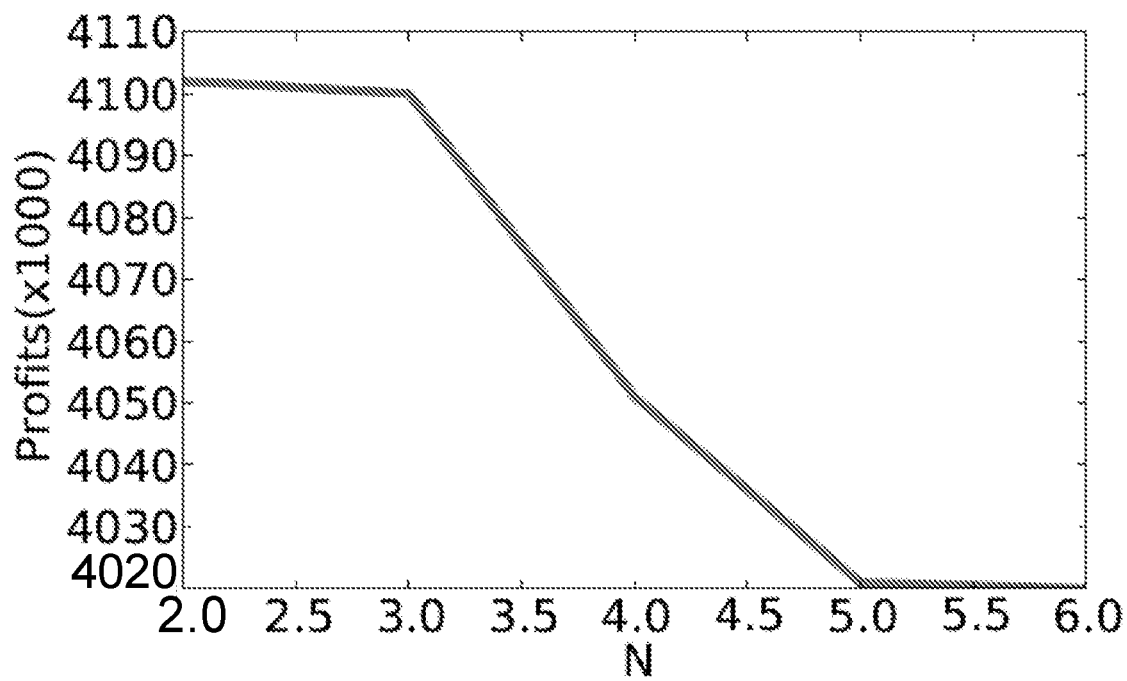
Figure 16A:
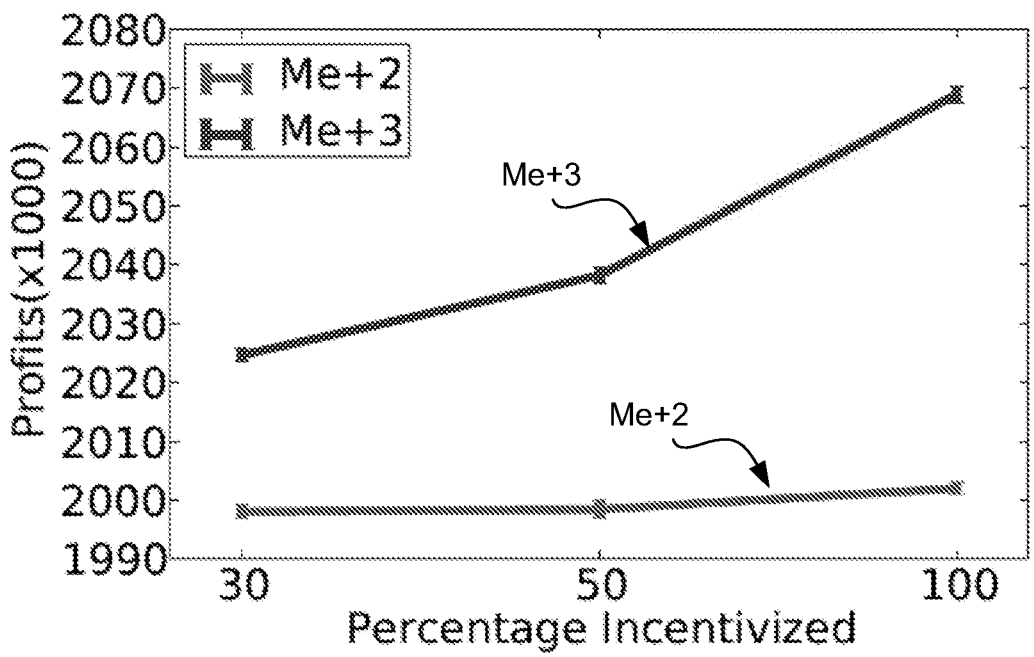
Figure 16B:
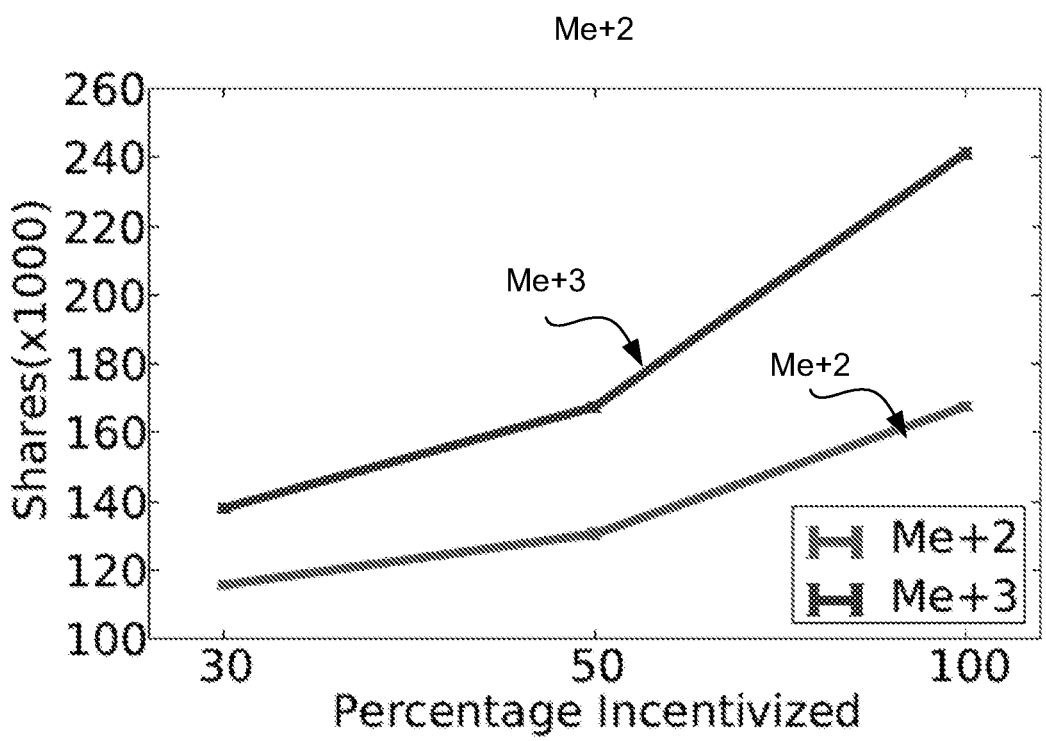
Figure 16C:
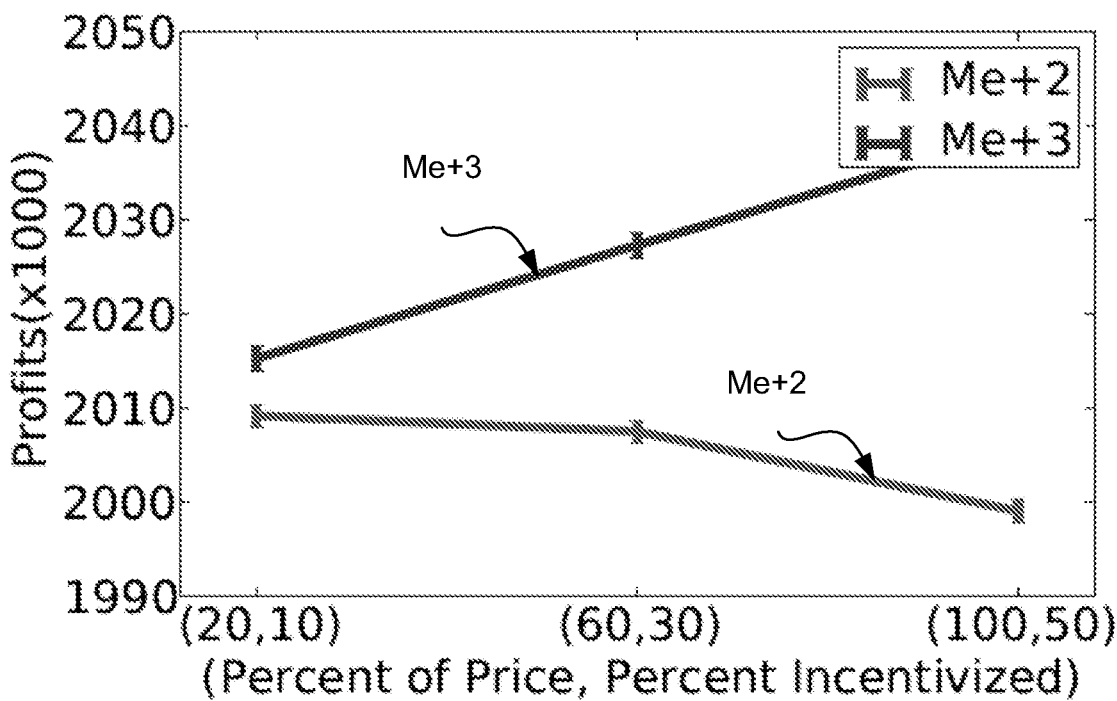
Figure 16D:
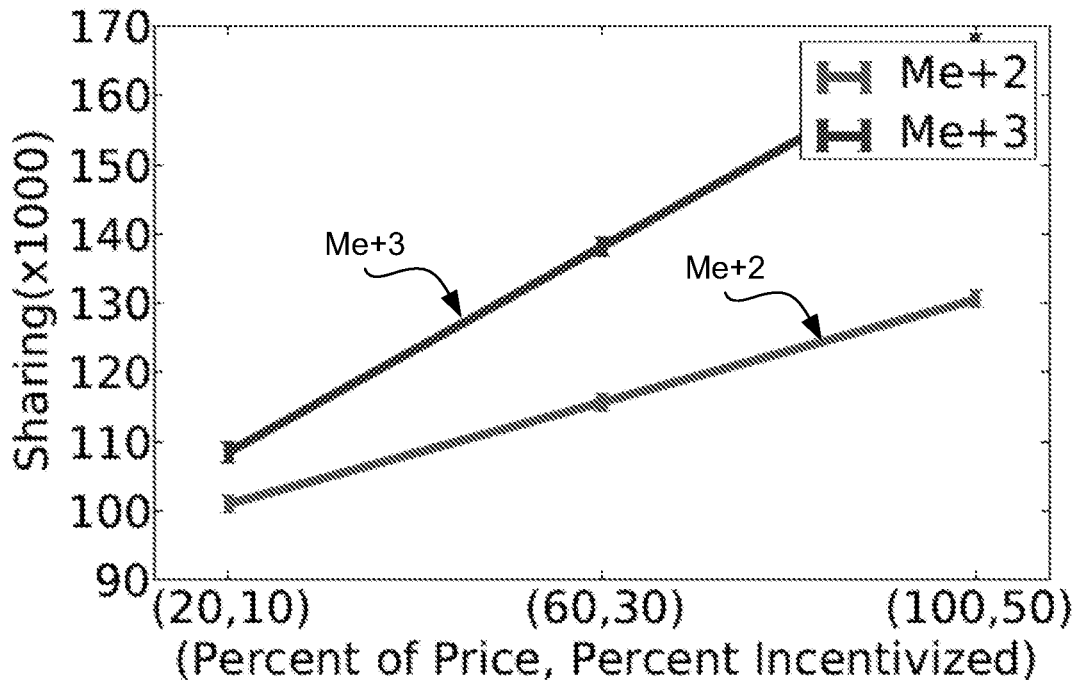

FIGS. 15a, 15b, and 15c illustrate the results when the percentage of the profits the broker receives is varied;

FIG. 15d shows the performance when the reward given back to the individual is limited to 20% of the deal price;

FIG. 16a illustrates the effects when increasing the percentage of incentivized users for Me+2 and Me+3;

FIG. 16b illustrates the effect on the number of shares when increasing the volume for Me+2 and Me+3; and FIGS. 16c and 16d illustrate linearly increasing the reward and percentage of incentivized users to show the change in profits and increase in shares, respectively.

DESCRIPTION

Overview

The following description provides techniques, models, methods, and systems for incentivization modeling of sharing in networks. The modeling provides simulation and refinement of incentivized deals to promote sharing between users without the need for expensive large-scale social experiments that would otherwise be required to determine the effect of any incentivization scenario for any particular network.

In particular, simulation and optimization or improvements for profitability is provided for the sharing model for Me+N. Me+N is an incentivized sharing model that provides a user, after purchasing a product, a reward if the user convinces N or more others to purchase the same product or service. The optimization is able to account for a number of factors that may change the overall profitability of the sharing model in any particular social network. Examples of three such factors include 1) the reward amount, 2) product/service profit margin, and 3) the threshold N for the number of adopting friends that results in receiving the reward. However, one will appreciate that the methods and systems described herein can incorporate other factors, as discussed in further detail below.

In contrast to viral marketing strategies, which rely on identifying influential members, companies have recently started to offer all customers monetary incentives to convince their friends to join an online service or adopt a product, but withhold the reward until the incentive goal (e.g., a friend adopting) is completed. By doing this, they utilize users' social networks to rapidly increase the volume of site users.

Besides priming users with incentives for attracting new users, several sites tie monetary incentives into sharing (or recommending) products with new and existing customers and rewarding the recommenders when the referred customers purchase products from the site. For example, users who share a deal with their friends get credit equal to the price of that deal towards future purchases if at least two of their friends buy the recommended deal. A more conservative, but immediately applicable, post-purchase incentive called Me+3 provides that when a user persuades three (or more) friends to purchase a particular deal, the user is refunded their own purchase of the deal.

Such incentives can have measurable impacts on the behavior of users and can be of benefit to both users and companies. For instance, using the above example, a user with only one recommendation recipient in mind may choose to expand the number of recommendations or shares, with the intent of convincing two additional people to purchase the deal and receiving the deal for free. On the other hand, the company can get additional purchasers through these recommendations, and recoup the cost of the free deal, as well as increase profits and grow their potential pool of buyers for future deals.

While such incentives become increasingly more popular among online retailers, if a deal is not properly structured, the company can stand to lose money, which is undesired. In addition, it is often difficult to determine which incentivization works without actually giving the incentivization to users and monitoring the results. However, this again exposes the provider to less the optimal profits or even a loss. Conventional viral marketing strategies approach this problem by concentrating on identifying a relatively small set of individuals with high network values and incentivizing them to adopt a product, in the hope that they would influence many others to also adopt this product.

As pointed out above, sharing scenarios to maximize, optimize, or improve a network's profits are often hard to predict. As a result, significant investments in expensive large-scale social experiments would be required to determine results for any particular combinations of products and rewards given any number of different factors including those listed above. However, the techniques, models, methods, and systems provided herein allow determinations to optimize deals for products on various networks through simulations that may be quickly run and determined based on a network's own data. In addition, parameters may be easily changed to determine an optimized scenario for any particular network, product, or deal.

Incentivized Deals

Figure 1:
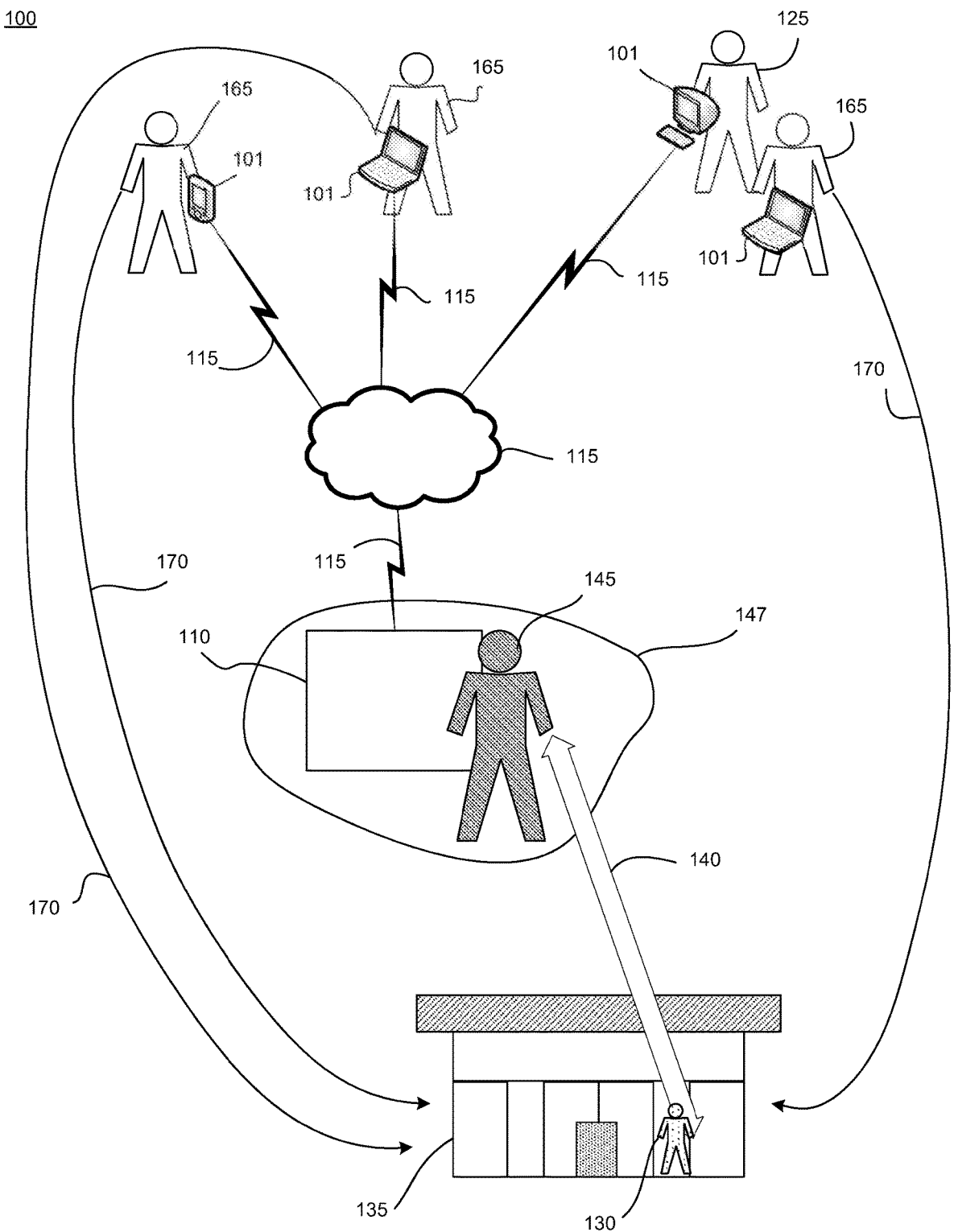
FIG. 1 is a block diagram of an example of an online social network system.

FIG. 1 shows one example of an online commerce system 100 that is designed to promote goods and services. The online commerce system 100 includes one or more user devices 101, one or more service provider systems 110, and various communication paths 115 that provide content and data between users and the service provider system 110 and other users, for example. In particular, the service provider system 110 provides online deals through an interface provided by the user device 101, such as a browser or mobile application interface. The deal is provided to a buyer 125 to incentivize the buyer 125 to share the deal with or to refer the deal to other people (e.g., friends, family, acquaintances, colleagues, and others) via some form of electronic communications (e.g., e-mail, text messaging, or other online social media, such as Twitter, Facebook, Skype, Blogs, etc). The deal is an incentive (e.g., a reward or a monetary discount) given for one or more items or services for sale by a merchant 130 at a store 135. The deal may be offered for a set period of time (e.g., 24 hours). In the example shown in FIG. 1, the merchant 130 enters into a relationship 140 with an online service provider, for example, a deal broker 145 of a deal brokerage 147. In this example, the deal is offered by the deal brokerage 147 via the service provider system 110. For example, a website hosted by the service provider system 110 is created and managed by the service provider system 110. The website is controlled by or accessible to one or more deal brokers 145. The buyer 125 communicates with the service provider system 110 through a communication path 115. In particular, each buyer 125 accesses the deal website hosted by the service provider system 110 via a communications network provided by the communication path using a browser or a mobile application running on a user device 101.

As discussed in greater detail below, the deal website provides an interface through which the buyer 125 can obtain information about the deal, for example, the location at which the deal can be used, the price of deal, a description of the item or items for sale in the deal, or the time during which deal is offered.

The item or items for sale associated with a deal can be a product (e.g., food, article of manufacture) or a service (e.g., cleaning services or transportation services) or groups of products or groups of services. The deal website enables the buyer 125 to purchase the deal and then share the deal with others.

The user device 101 may be any type of electronic device that presents, plays, or renders content, such as a web page accessed from the Internet or World Wide Web for a user. Typically, a user device is a computer device includes one or more processing devices as described below. For example, the user device may be a consumer electronics device, a mobile phone, a smart phone, a personal data assistant, a digital tablet/pad computer, a hand held/mobile computer, a personal computer, a notebook computer, a work station, a vehicle computer, a game system, a set-top-box, or any other device that can implement a user interface and/or browser to communicate with, access, and present content from the Internet or World Wide Web to a user and/or communicate over a the communication path 115 to access the service provider system 110.

The service provider system 110 includes one or more programmable processing devices that are able to respond to instructions in a well-defined manner and can execute instructions (such as found in a program or engine). The service provider system 110 includes electronic and digital components, including hardware needed to implement the instructions and read/access data. The service provider system 110 includes a communication mechanism that is able to communicate with the user devices 101 through a communication path 115. Additionally, the service provider system 110 includes one or more components, such as a web server that hosts and manages the deal website. The deal website can be public (viewable by anyone on the Internet) or private (viewable only by persons who have provided identifiable information and have received a unique identification number). Details of the service provider system 110 are shown in FIG. 2 and are discussed below with reference to FIG. 2.

The deal brokerage 147 is a party that offers the deal in a deal website provided by the service provider system 110. In one example, the deal brokerage 147 does not maintain an inventory of goods or services. Rather, it is the merchant 130 who maintains the inventory, for example, at the merchant store 135 or at a location such as a warehouse that may be distinct from the merchant store 135. The merchant store 135 can be a brick and mortar store physically located near to the buyer 125 or to someone else (such as a recipient 165 of the deal) who will be receiving the deal obtained by the buyer 125. The store 135 can alternatively or additionally include a virtual (that is, online) store accessible through the communication paths 115.

Figure 2:
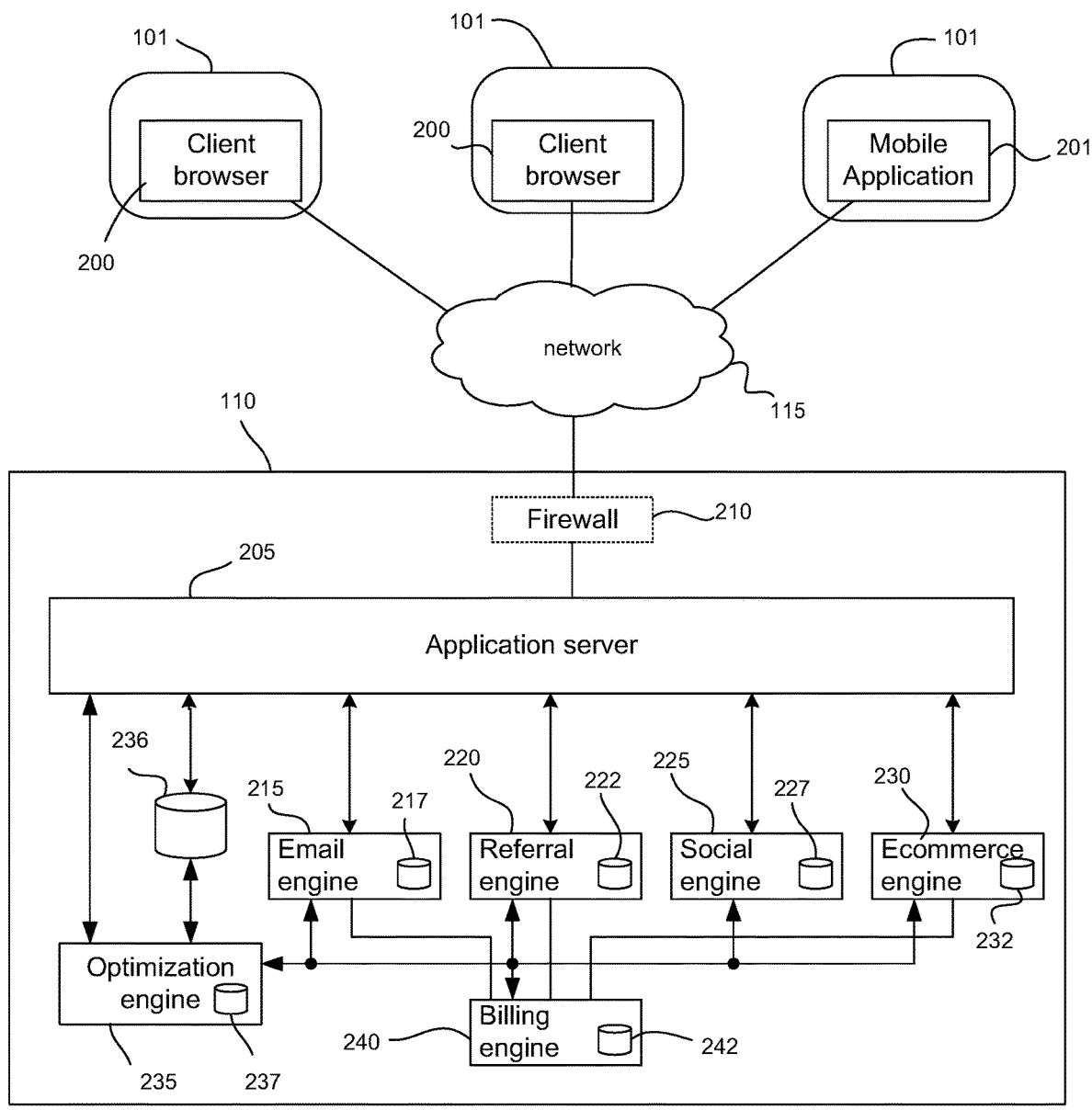
FIG. 2 is a block diagram of hardware components of an example of online social network offer deals and optimization of incentivization for the system of FIG. 1.

Referring to FIG. 2, one example of the hardware components of the online commerce system 100 are shown along with their relationships to each other. In particular, each user device 101 includes a network browser 200 or mobile application 201 that provides a user interface on the user device 101 to permit access to and interaction with the deal website. The deal website is displayed or accessible by the network browser 200 or mobile application 201.

In one example, the service provider system 110 includes one or more processing devices with supporting memory and communications infrastructure/interfaces that are able to communicate with the user devices 101 via the communication paths 115. In one example, the processing devices may be one or more application server(s) 205. The one or more application servers may be protected by one or more security devices, such as a firewall 210. The application server 205 includes a combination of hardware and software to provide and manage the deal offers to the interface of the user devices 101 via the communication paths 115. The application server 205 can include a combination of memory and input/output devices. The application server 205 is connected to one or more applications or software engines, such as an electronic mail (email) engine 215, a referral engine 220, a social engine 225, an ecommerce engine 230, and an optimization engine 235. In one example, these engines may be implemented by one or more additional servers. Additionally, the application server 205 can be connected to a database 236. Additionally, each engine 215, 220, 225, 230, 235 can include its own dedicated database 217, 222, 227, 232, 237 that can be accessible by the application server 205. The email engine 215, the referral engine 220, and the ecommerce engine 230 are connected to a billing engine 240, which can also include a dedicated database 242.

The optimization engine 235 may be connected to all the engines and database in order to access information and data used in optimization processing and modeling. The engine 235 implements an optimization process, such as those described in greater detail below with regard to FIGS. 13 and 14.

It will be appreciated that the examples in FIGS. 1 and 2 are given for illustrative purposes only, and that many different configurations, combinations of devices, and numbers of devices may be provided for any particular commerce system 100. For example, although only one application server (e.g., 205) and associate database 236 are shown, it will be appreciated that in actual implementation other configurations of servers or combining of servers may be provided or banks of a number of these machines as necessary may be provided to handle the number of users, data, and traffic that a particular implementation of a service provider system 110 handles.

In addition, other types of hardware may be used, such as various types of computers featuring any of various processors running any of several operating systems. In addition, service provider system 110 may be configured to provide a location that is centralized and/or remote from the perspective of the user. The central location may be one physical location, such as a room, building, or campus providing the hardware components of the system 110. However, in reality the central location may be virtual or distributed where services are provided, content are accessed from, and data is stored over a number of distributed systems and/or geographic locations. In other words, although the service provider system 110 is shown in FIG. 1 as being a single entity, other configurations wherein the applications, processing, services, content, and data are distributed both in terms of devices and geographical location are within the meaning of the service provider system 110. Additionally, the service provider system 110 may use third parties to host the web page or website and may initiate services as needed on demand, for example, using cloud computing wherein the locations and structure providing the services change size, and physical location, distribution, and even equipment dynamically over time.

Figure 3:
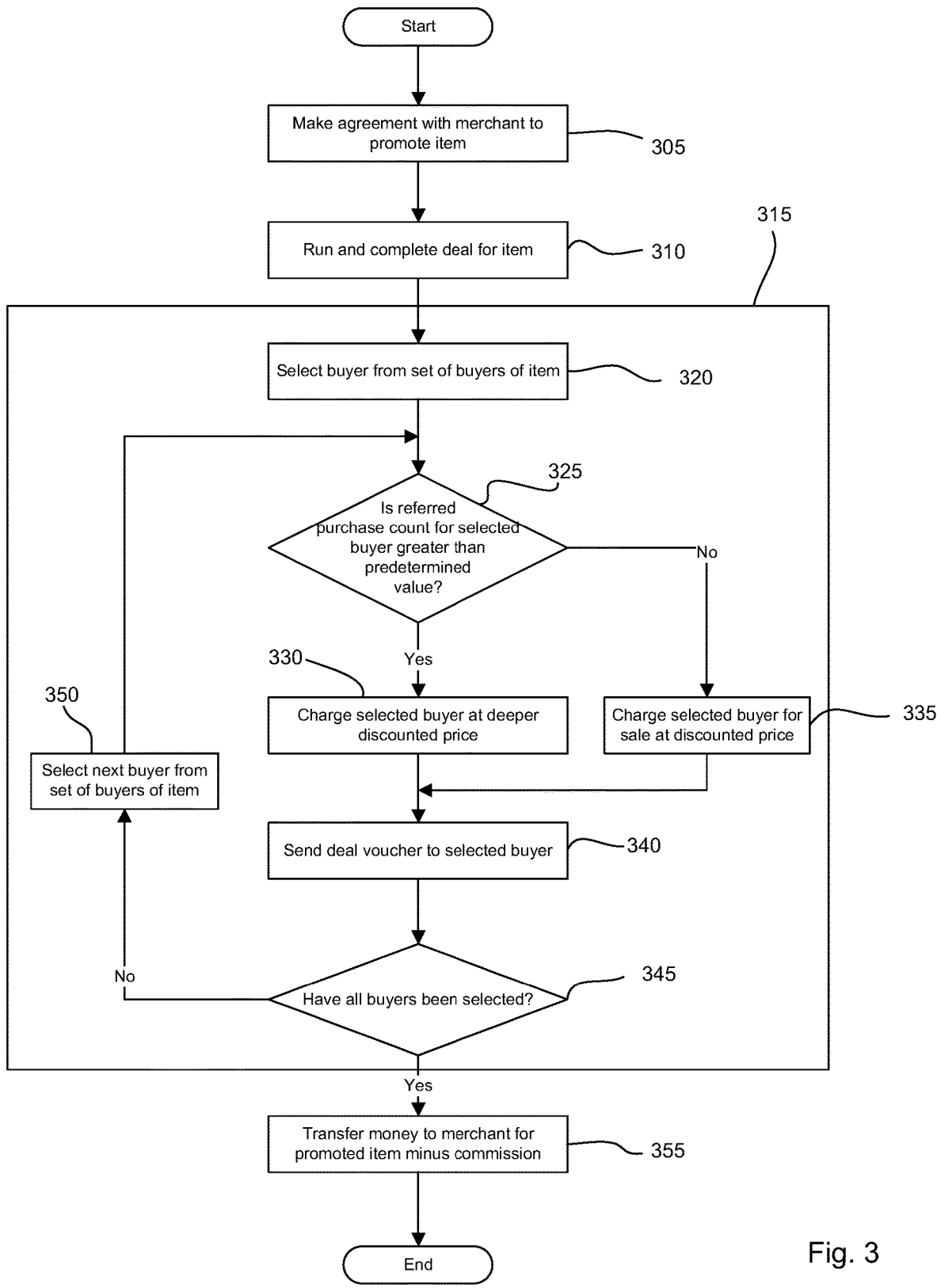
FIG. 3 is a flow chart of a procedure performed by the online social network system of FIGS. 1 and 2.

Referring to FIG. 3, a procedure 300 is performed to provide an online buying experience to the buyers 125. To facilitate understanding of the procedure 300, reference is made to FIG. 4, which shows a screen shot 400 of a deal voucher sent by email (or any other suitable communication method) to a buyer 125 for a deal offered for an item or items from fictional merchant Yogery Café; FIGS. 6-10, which show screen shots of a deal website 605 hosted by the service provider system 110 to provide a deal on items for the Yogery Café, and to FIG. 11, which shows an email 1100 sent by the service provider system 110 to a friend of the buyer 125. In the example of FIGS. 4-11, the deal is a monetary discount (for example, 50%) off a voucher having a certain value for items such as yogurt and toppings sold by Yogery Café. Thus, in this example, a buyer 125 who accepts the deal offer purchases a voucher at a price of $10 that is good toward the purchase of $20 worth of yogurt and toppings at Yogery Café.

Initially in the procedure 300, after the deal broker 145 and the merchant 130 have established the business relationship 160, the deal broker 145 makes an agreement with the merchant 130 to promote an item or items for sale on the deal website hosted by the service provider system 110 for a period of time (305). The agreement specifies terms of the offer that the deal brokerage 147 will advertise on the deal website. For example, the deal broker 145 makes an agreement with Yogery Café to promote the $20 voucher on the deal website for a period of time of 24 hours.

Figure 5:
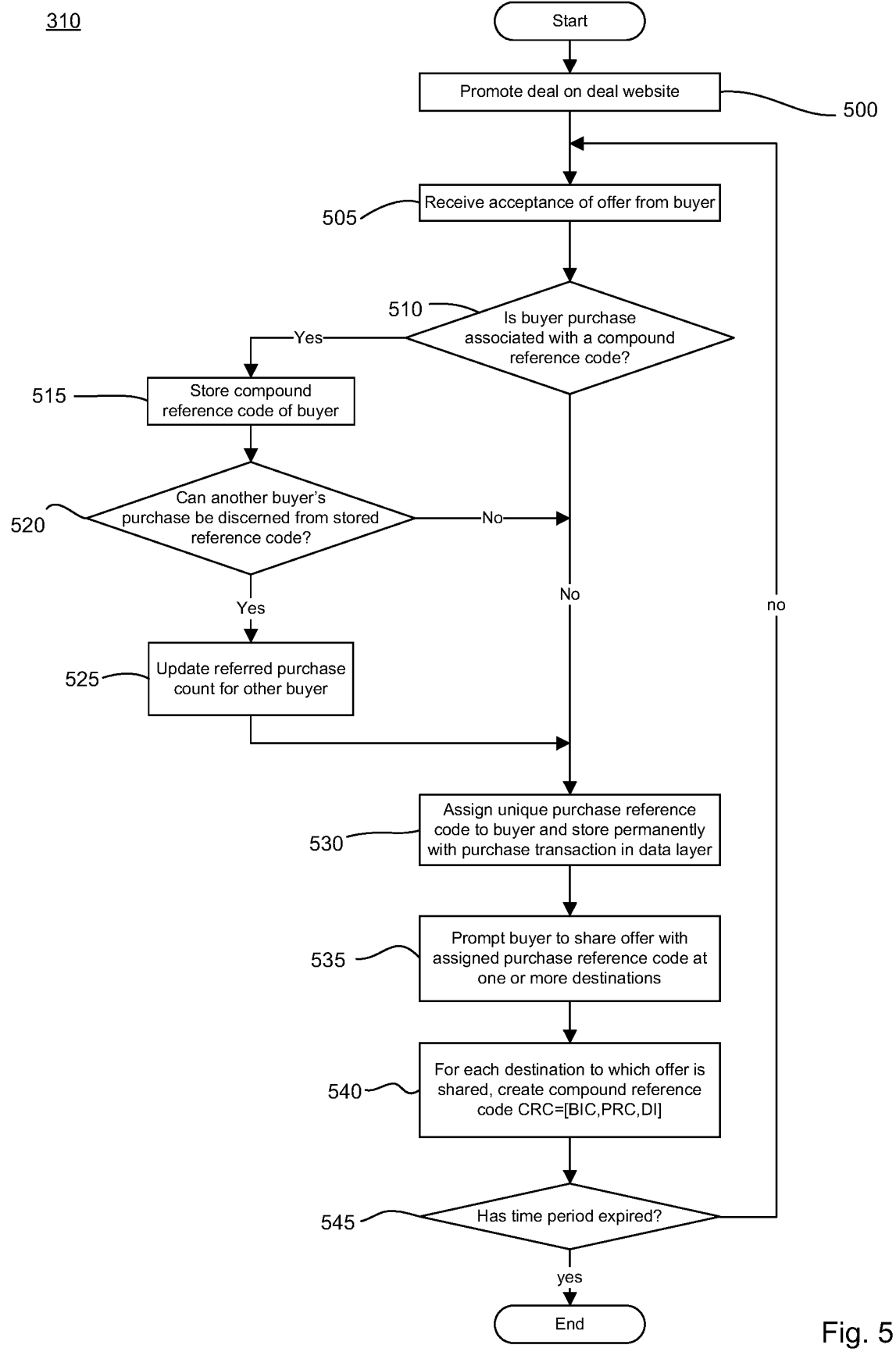
FIG. 5 is a flow chart of a procedure performed by the deal machine of the online social network system of FIGS. 1 and 2.

Next, the service provider system 110 (specifically, application server 205 with assistance from one or more of the email engine 215, the referral engine 220, the social engine 225, and the ecommerce engine 230) runs the deal on the item or items for the period of time (310), as detailed in the procedure 310 of FIG. 5 and as shown in the exemplary screen shots of FIGS. 6-10. For example, the service provider system 110 is configured to promote the deal on the deal website, receive acceptances of the deal from the buyer 125 through the deal website, receive payment by the buyer 125, and confirm the deal acceptances through email or on a separate browser to the buyer 125. During processing 310, and as discussed in detail with reference to FIG. 5, the service provider system 110 also notifies each buyer 125 that the buyer 125 would obtain a greater monetary discount (for example, 75 or 100% off) on the voucher for the item or items if enough (for example, at least N) friends of the buyer 125 purchase the same deal after being prompted by the buyer 125 through a dedicated and identifiable link or message. This is described herein as an incentivized deal which encourages a purchaser of the deal to share the deal with others.

After the online deal is completed (that is, after the expiration of period of time for which the online deal was offered), the service provider system 110, and in particular, the application server 205 with assistance from the billing engine 240, performs a billing procedure 315 for determining how much to charge each buyer 125 who accepted the deal.

Initially, the service provider system 110 selects a buyer 125 from the set of buyers who accepted the deal (320). The service provider system 110 determines if a referred purchase count for the selected buyer is greater than a predetermined value, for example, N (325). The referred purchase count indicates how many other buyers purchased the deal upon a prompt or referral by the selected buyer, as detailed in the description with reference to FIG. 5. The billing engine 240 accesses information about the referred purchase count from the referral engine 220, which tracks the count in its own database 222 or in the database 235.

If the service provider system 110 determines that the referred purchase count for the selected buyer is not greater than the predetermined value (325), then the service provider system 110 charges the selected buyer for the deal at the original monetary discount (335). For example, if the original deal is a monetary discount of 50% off a single $20 voucher, then the selected buyer would be charged $10. The service provider system 110 can perform the charge transaction using any suitable ecommerce system, such as, for example, a credit card payment or a payment intermediary service (such as PayPal). In particular, the billing engine 240 accesses the ecommerce engine 230, which is responsible for collecting and processing payment information of the buyer when the deal is purchased. The billing engine 230 instructs the ecommerce engine 230 on which buyer to charge and a quantity and amount to charge to the buyer's account. In some implementations, the ecommerce engine 230 may control another ecommerce system through which the buyer 125 has chosen to make payments. The billing engine 240 pulls the billing information from the ecommerce engine 230 so that the service provider system 110 can effectuate the charge to the buyer's account.

If the service provider system 110 determines that the referred purchase count for the selected buyer is greater than the predetermined value (325), then the service provider system 110 (through the billing engine 240) charges the selected buyer for the deal at a new monetary discount that is greater than the original monetary discount (330). For example, if the original deal is a monetary discount of 50% off a single $20 voucher and the new monetary discount is 100% off a single $20 voucher, then the selected buyer would not be charged. As another example, if the original deal is a monetary discount of 50% off a single $20 voucher and the new monetary discount is 75% off a single $20 voucher, then the selected buyer would be charged $5.

The new monetary discount can be any discount that is greater than the original monetary discount. The new monetary discount can be dependent on the way in which the buyer shared the deal with the other people who eventually purchased the deal. For example, a new monetary discount of 100% can be given if the buyer shared the deal with people through email and a new monetary discount of 75% can be given if the buyer shared the deal with people through a social medium such as Twitter or Facebook.

Figure 4:
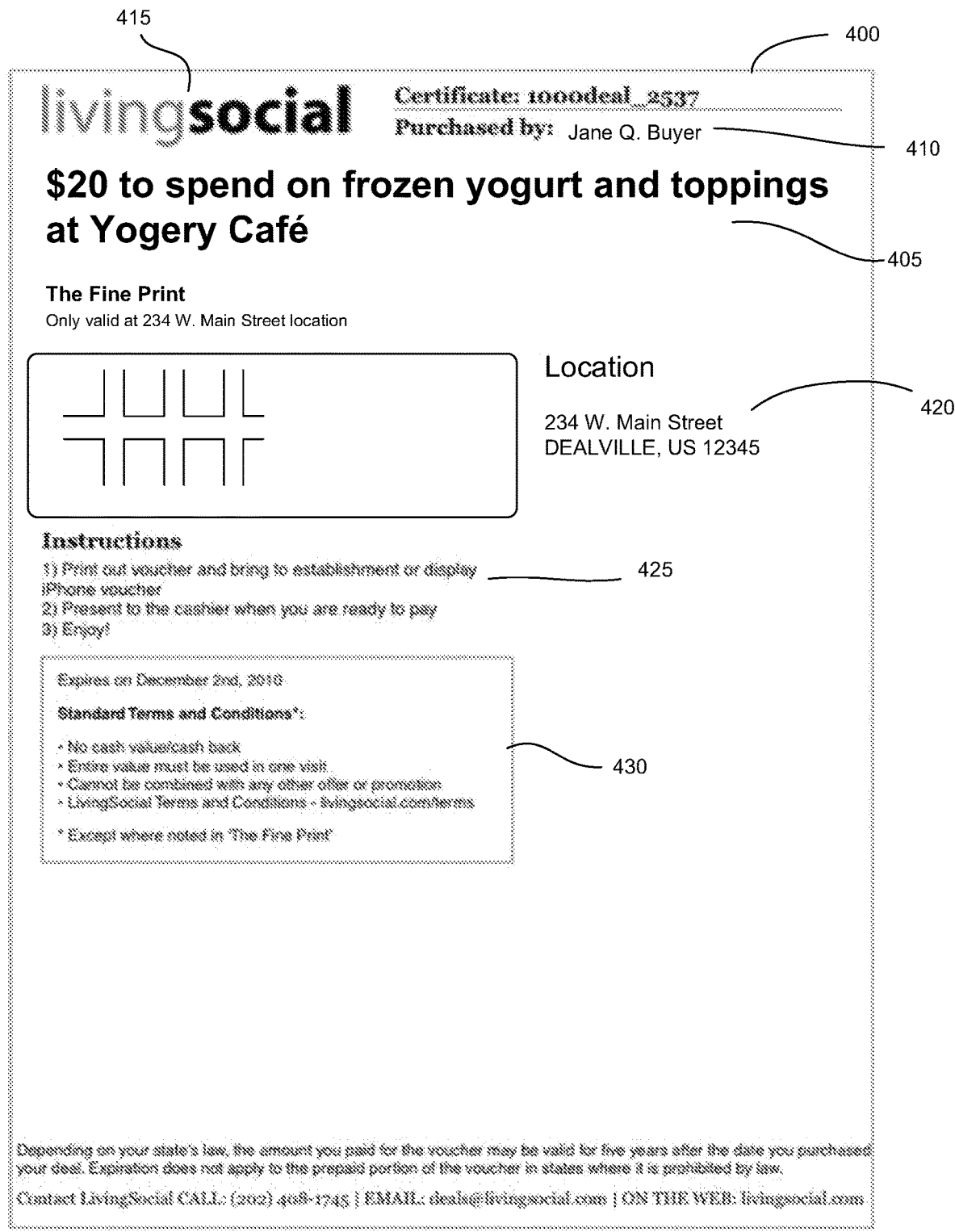
FIG. 4 is a screen shot of deal voucher presented to a buyer in the online social network system of FIGS. 1 and 2.

The service provider system 110 then sends the deal voucher to the selected buyer 125 (340). The deal voucher can be sent by electronic methods, such as email, messaging, and social media. For example, as shown in FIG. 4, a deal voucher 400 for $20 to spend on frozen yogurt and toppings at Yogery Café (the deal 405) is sent by email to the buyer 125 (who, in this example, is named Jane Q. Buyer 410). The deal voucher 400 can also include the name 415 of the deal broker 145, information about the location 420 of the merchant 115, instructions 425 on how to use the deal voucher 400, and standard terms and conditions 430.

The service provider system 110 determines if all buyers in the set of buyers who accept the deal have been selected (345). If the service provider system 110 determines that not all buyers have been selected (345), then the service provider system 110 selects the next buyer from the set of buyers who accept the deal (350). If the service provider system 110 determines that all buyers have been selected (345), then the billing engine 240 processes an end-of-deal report that is supplied to the merchant 130 (355), such report can provide information, for example, about how many buyers received the deal, how many buyers received the free deal through referrals, and a check amount for a given merchant. In addition, the data from these reports may be used in optimization modeling to determine the number of others N that the buyer 125 needs to share with to obtain the reward, as explained in further detail below. The transfer of the money to the merchant 130 for the deal minus a commission can happen offline. However, it is possible that the money transfer to the merchant 130 be automatic and performed by the billing engine 240. For example, if 1000 buyers 125 purchase the deal voucher at the original monetary discount of 50% off a single $20 voucher, 500 buyers 125 purchase the deal voucher at a new monetary discount of 100% off a single $20 voucher, and the commission agreed to by the merchant 130 and the deal broker 145 is 30%, then $7000.00 is transferred from the deal brokerage 147 to the merchant 130. Such transfer can be performed by the service provider system 110 if done online. In this example, the deal broker 145 retains a $3000.00 commission.

Figure 6:
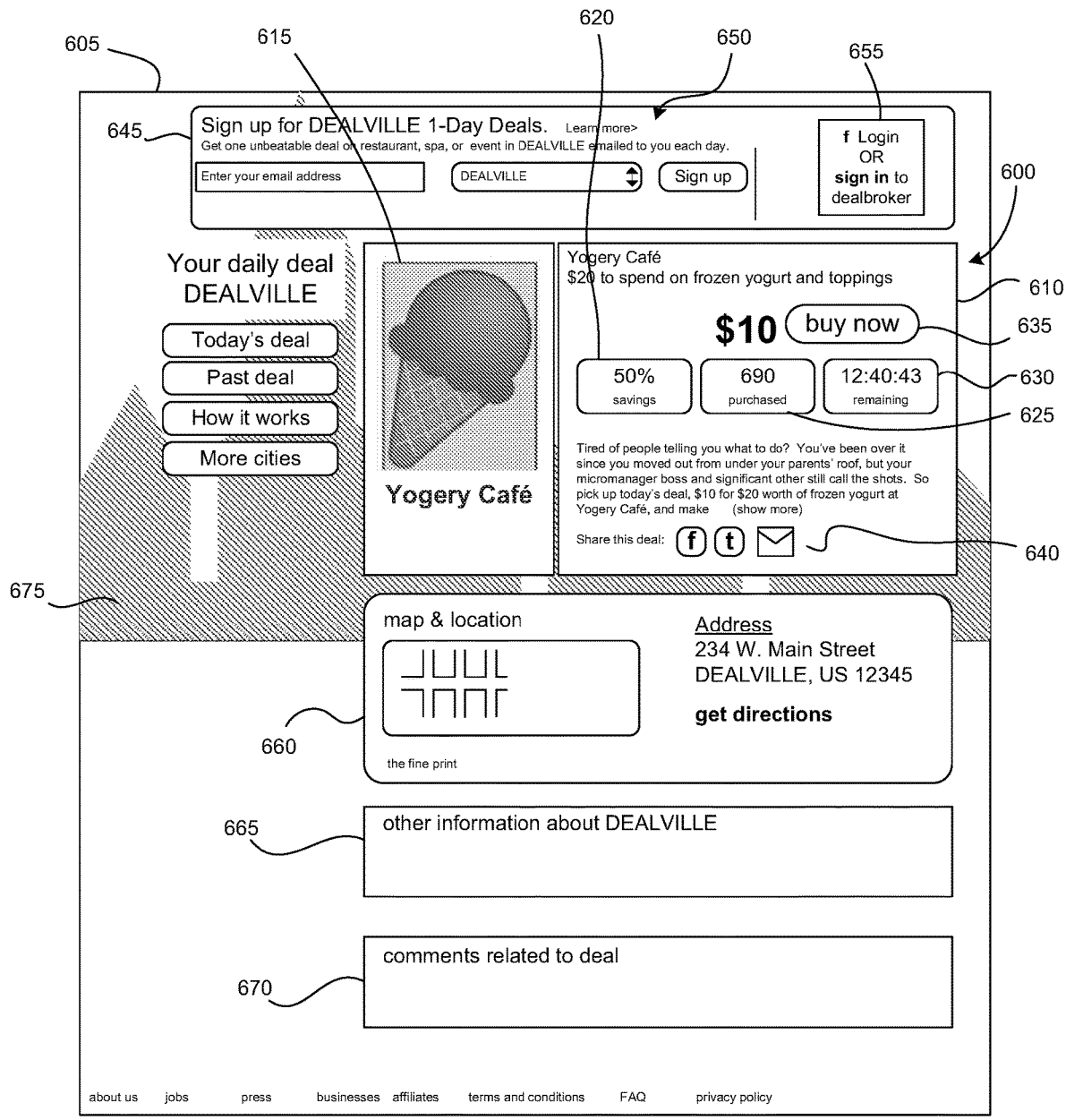
FIGS. 6-10 are screen shots of a deal website created and managed by the deal machine of the online social network system of FIGS. 1 and 2.

Referring to FIG. 5, the service provider system 110 performs the procedure 310 to run the deal on the item or items for the period of time. Initially, the service provider system 110 through the application server 205, which accesses, for example, the ecommerce engine 225 and the referral engine 220, promotes the deal for the item or items on the deal website (500). For example, as shown in the example of FIG. 6, a deal 600 for frozen yogurt and toppings at the merchant Yogery Café is promoted on a deal website 605. The deal 600 provides a monetary discount of 50% off a $20 voucher so that a buyer 125 of the deal would only pay $10 for a $20 voucher than could be used on yogurt and toppings at the Yogery Café. The deal 600 is displayed in a window 610 that can also display information about the deal and the merchant, Yogery Café. For example, the window 610 can display an image 615 of the item or items offered in the deal, an icon 620 displaying the monetary discount, an icon 625 displaying the number of other people who have already bought the deal, and an icon 630 displaying the time remaining in the open period (that is, the time remaining during which the deal can be bought). The window 610 displays a button 635 that enables a person visiting the deal website 605 to start a transaction to buy the deal 600. The window 610 also includes one or more icons 640 that prompt the person visiting the deal website 605 to share the deal 600 with other people. For example, the icons 640 can display links to social media such as Facebook and Twitter or to email.

The deal website 605 can include other windows, icons, buttons, images, shapes, text, media, video, etc. such as, for example, an access window 645. The access window 645 provides a region 650 to enable a person to sign up for an account with the deal broker 145 to get deals in Dealville (which is the location at which this deal 600 is being offered and is the location of the Yogery Café). The access window 645 also includes a link 655 that enables a person who already has an account with the deal broker 145 to sign in to his/her account to purchase this deal 600 or to login using his/her social networking log-in information. As another example, the deal website 605 can include a location window 660 that provides geographic information about the location (in this example, Dealville) at which the deal voucher 400 can be used. This information can include an address, a map, and a link to directions. The deal website 605 can include a city window 665 that provides other more general information about the location (in this example, Dealville) at which the deal voucher 400 can be used or a user feedback window 670 that provides an area in which users can submit comments about the deal 600 and/or the location of the deal 600.

The deal website 605 can also include a background image 675 that can be selected to correspond specifically to the location of the deal 600. For example, the background image 675 can be a photograph of a part of the Dealville skyline.

Next, the service provider system 110 through the application server 205, which accesses the ecommerce engine 230, receives an acceptance of an offer from a buyer 125 (505).

Acceptance of an offer from a buyer 125 (505) can be predicated on requiring a buyer 125 to log into an account the buyer 125 has set up with the deal broker 145 through the service provider system 110. The deal broker 145 can set up an account with the deal broker 145 at any time before accepting the offer. The buyer account can include stored information about a preferred method of payment used by the buyer 125 (for example, a credit card and number of the buyer) in addition to a unique buyer identification code. The buyer account can also specify preferred cities in which the buyer 125 would be interested in getting information about deals. For example and with reference to FIG. 6, the buyer 125 can indicate that Dealville is a preferred city and therefore the buyer 125 would see the Dealville deal whenever the buyer 125 accesses the deal website. The buyer 125 can sign in to his/her deal broker account by, for example, selecting the link 655. The buyer 125 can sign in to his/her deal broker account by signing in to a social media account such as Facebook, which can be linked to his deal broker account, by, for example, activating the link 655. If the buyer 125 does not have a deal broker account, then the buyer 125 can be prompted to create an account through the window 650.

Figure 7:
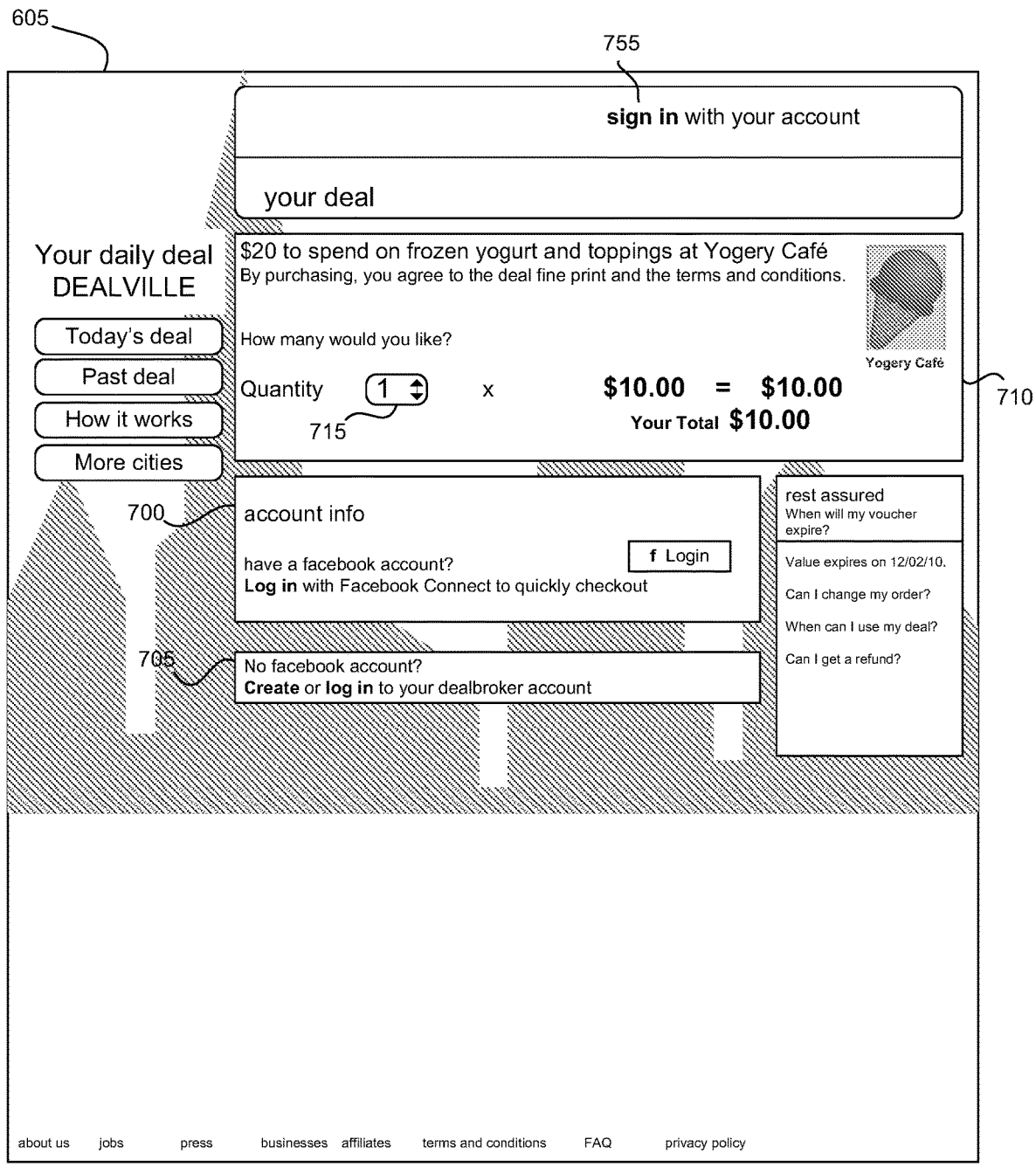

To accept the offer, the buyer 125 selects the "buy now" button 635, at which time the service provider system 110 alters the deal website 605 to that shown in FIG. 7. The buyer 125 can review the deal 600 in a new deal window 710 that displays particulars about the deal 600, including the price and the quantity 715. Additionally, if at this point, the buyer 125 has not yet signed in to his/her account, the buyer 125 is given another chance to do so at this time through selection of a link 755 (which enables direct sign in to the deal broker account), a sub-window 700 (which enables access through the social media account), or a sub-window 705 (which enables creation of a new deal broker account).

Figure 8:
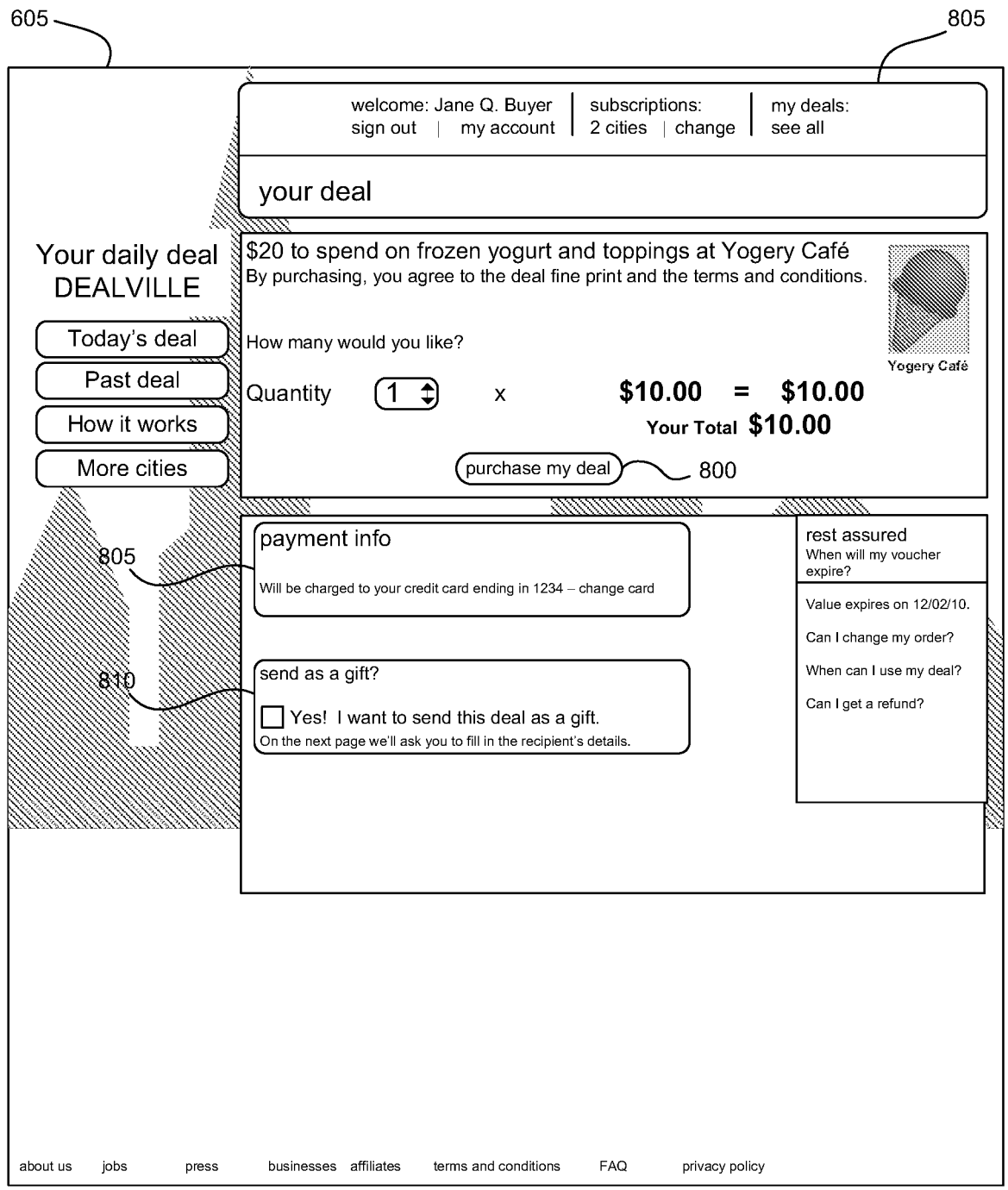

Referring to FIG. 8, if the buyer 125 has already signed in to his/her account in a previous step, then the deal website 605 displays a button 800 that enables the buyer 125 to purchase the deal. Additionally, the deal website 605 displays an account window 805 that provides information about the buyer 125 and his/her account. The buyer 125 is also given the option in a gift sub-window 810 to give the deal as a gift to someone else (for example, to the recipient 165).

Referring again to FIG. 5, after the buyer 125 accepts the deal offer (505), the service provider system 110 determines whether the buyer purchase at 505 is associated with a compound reference code (510). The compound reference code (CRC) would be assigned to the buyer 125 if the buyer 125 accessed this particular deal by selecting a referral from another buyer of the deal (this buyer can be referred to as a deal-sharing buyer). The CRC is used to track the referrals of the deal-sharing buyer to determine whether the deal-sharing buyer's referrals result in a predetermined number of deal purchases by the buyer's friends. The CRC is a set of values that includes the buyer identification code that is related to the deal-sharing buyer (BIC), an assigned purchase reference code (PRC) that is related to the deal-sharing buyer, and a destination identifier (DI) that is related to the manner in which the deal-sharing buyer referred the deal to this buyer. Thus, the CRC=[BIC, PRC, DI]. As discussed above, the BIC is assigned to a buyer when the buyer sets up the deal broker account. The PRC is a code that is assigned the deal-sharing buyer when the deal-sharing buyer purchases the deal. A PRC will also be assigned to this buyer later in the procedure 310 as will a CRC if this buyer refers this deal. The DI is a code associated with how the deal-sharing buyer referred the deal to this buyer. For example, the DI can be 1 for a referral sent through email, 2 for a referral sent through Facebook, 3 for a referral sent through Twitter, 4 for a referral sent through an SMS or MMS text, 5 for a referral sent through an Instant Messaging service, etc. In this way, the CRC can be used to keep track of the deals referred by the deal-sharing buyer.

For example, if the buyer 125 is Jane Q. Buyer and she has a BIC of 3241, the deal for the Yogery Café that Jane Q. Buyer purchases has a PRC of 41-555, and the DI for the email referral is 1, then the CRC would be [3241, 41-555, 1].

If the service provider system 110 determines that the buyer purchase at 510 is associated with a compound reference code, then the service provider system 110 stores the compound reference code (515) and determines if a deal-sharing buyer's purchase can be discerned from the stored CRC (520). The service provider system 110 can make this determination by inspecting each component (that is, the BIC, PRC, DI) of the CRC to determine if each component is a valid component. Presumably if the deal-sharing buyer's purchase cannot be discerned from the stored CRC, then it is possible the CRC was fraudulent and in this case, the deal-sharing buyer would not be rewarded. If the service provider system 110 determines that the deal-sharing buyer's purchase can be discerned from the stored CRC (520), then the service provider system 110 updates the referred purchase count of the deal-sharing buyer by, for example, incrementing the referred purchase count by 1 (525).

Next, the service provider system 110 assigns a unique PRC to this buyer and stores that PRC with the purchase transaction in one of the databases accessible to the application server 205 (530). Thus, the PRC is a code from which can be discerned an identification of this buyer and of the item purchased in this transaction.

The service provider system 110 prompts the buyer 125 to share this particular deal offer with others using any suitable transmission (such as email) (535). If the buyer 125 decides to share this deal offer with others based on the specific prompt then that referral would have assigned to it the information about this buyer and the item in the deal that was purchased because the referral would have an assigned PRC in addition to other information as discussed below. The service provider system 110 can facilitate the referral (and therefore referral purchases) by accessing the social engine 225 to transmit messages to other users' social network(s). Next, for each destination through which this buyer 125 refers the deal offer, a CRC is created and assigned to the referral (540). The created CRC includes the BIC (the buyer identification code), the PRC (the information about this buyer and the deal), and the DI, the destination identifier.

Figure 9:
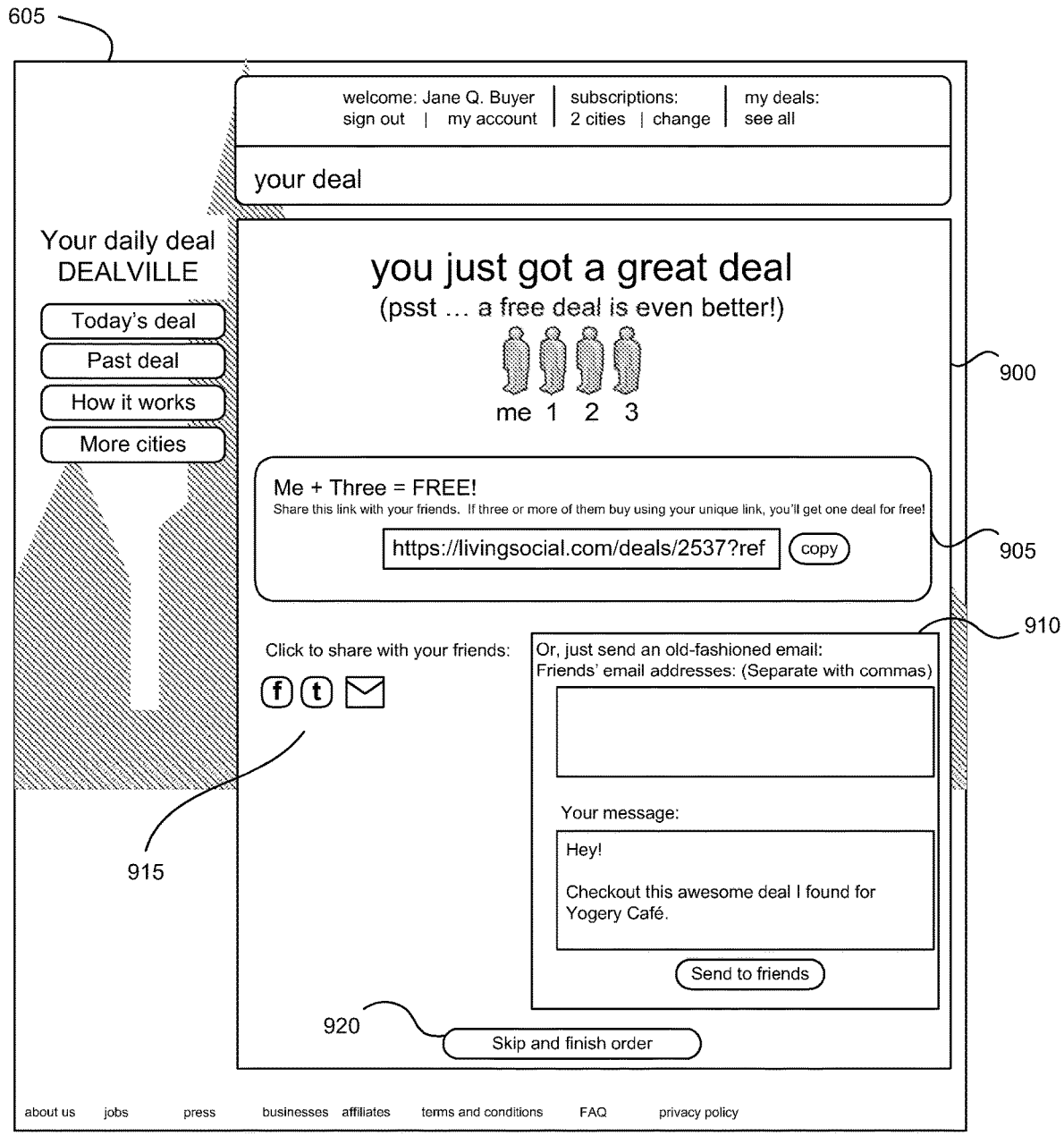
Figure 10:
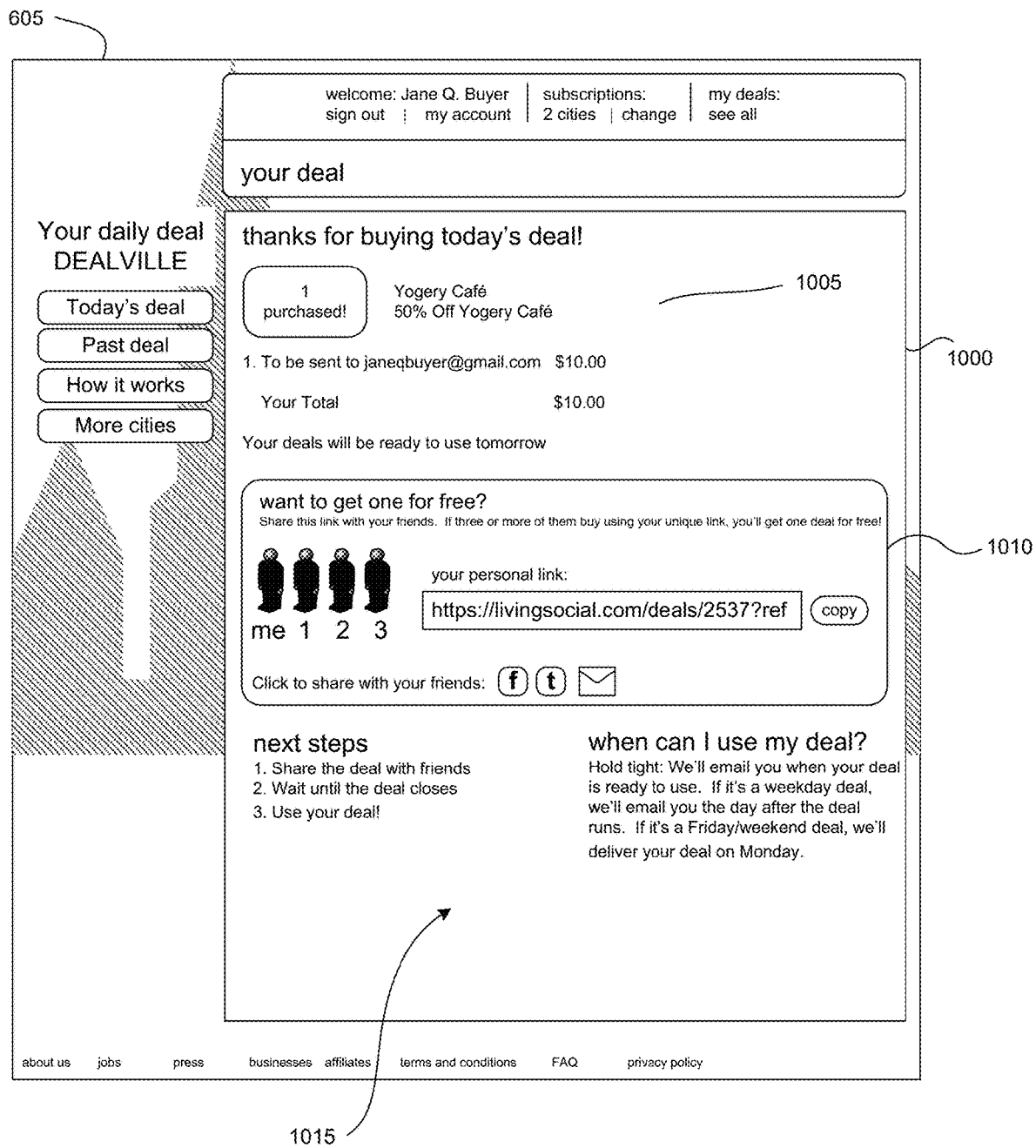

Specific examples of how the service provider system 110 prompts the buyer 125 to share this deal are shown in FIGS. 9 and 10. In FIG. 9, the buyer 125 has just purchased the deal, and the deal website 605 is updated to include a share window 900 that displays information about how this buyer 125 can get this deal at an even greater discount (in this example, the greater discount is 100% off). The share window 900 includes a link 905 that the buyer 125 can share with friends, the link 905 being associated with the assigned PRC and also associated with an assigned CRC for this buyer. The share window 900 can also include an email interface 910 that enables the buyer 125 to send an email to friends and include a message directly from the share window 900, such email would be associated with the assigned PRC and a CRC that is specific to the email. The share window 900 can include a click-to-share region 915 that opens another application (such as social media applications Facebook or Twitter or an email application such as Outlook) that would assign any message sent through these means with a unique PRC and a unique CRC depending on the method used to share the deal. And, the service provider system 110 can also include a decline button 920 that enables the buyer 125 to decline the sharing the deal at this time.

Figure 11:
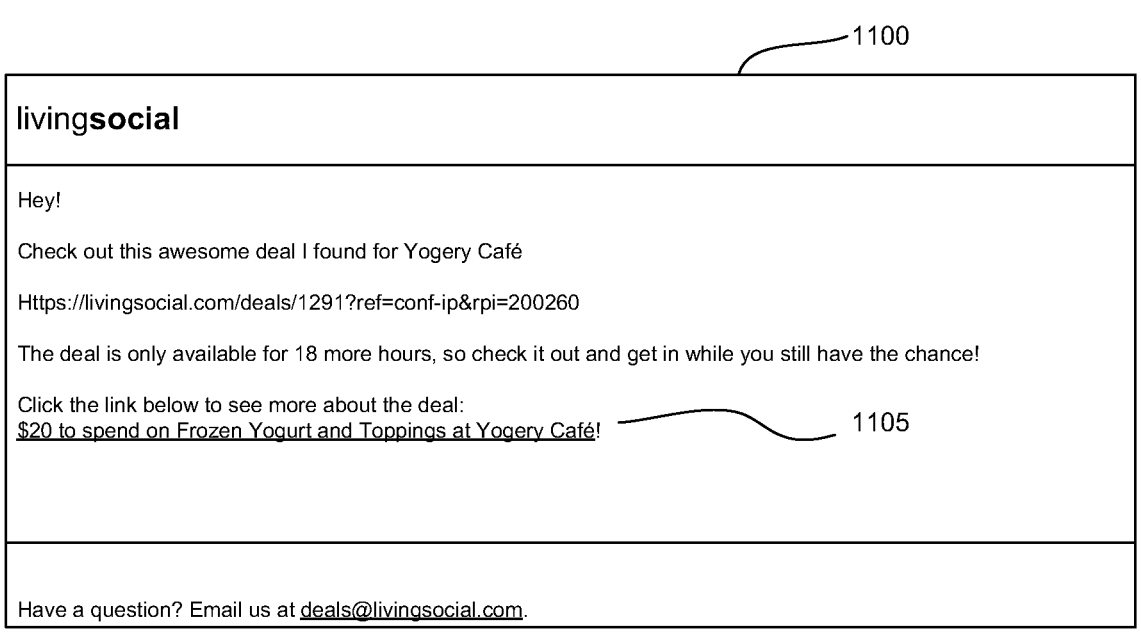
FIG. 11 is a screen shot of an electronic mail sent to a friend of a buyer in the online social network system of FIGS. 1 and 2.

Referring to FIG. 11, if the buyer 125 shares the deal offer with a friend through email, then the friend receives an email 1100 including a link 1105 that would have a unique CRC including the PRC for the deal purchased by the buyer 125, the DI for a referral sent through email, and the BIC for the buyer 125 who referred the deal. In the example provided above, the link 1105 for Jane Q. Buyer buying the Yogery Café deal 600 and referring it through email would have a CRC of [3241, 41-555, 1].

In FIG. 10, if the buyer 125 declines to share by clicking the decline button 920, then the service provider system 110 displays a confirmation window 1000 in the deal website 605.

Among other things, the confirmation window 1000 includes a purchase confirmation 1005 and another share window 1010 that displays information about how the buyer 125 can get this deal at the greater discount. The confirmation window 1000 can also include instructions 1015 to the buyer 125 on how and when to use the deal voucher.

Next in the procedure 310, the service provider system 110 determines if the deal time period has expired (545). If the deal time period has not expired, then the service provider system 110 continues to process purchases at 505. If the deal time period has expired, then the service provider system 110 performs the billing procedure 315 (FIG. 3).

Referring again to FIG. 1, once the deal is purchased, the buyer 125 can retain the deal for his/herself or the buyer 125 can give the deal to the recipient 165 (for example, by gifting the deal). The buyer 125 (or the recipient 165 of the deal if the recipient 165 is not the buyer 125) can use the deal (represented by the arrow 170) by accessing the merchant store 155 either in person (if the store 155 is a brick and mortar store) or virtually (for example, if the store 155 includes an online presence) before the expiration of the deal voucher. To use the deal, the buyer 125 presents the deal voucher to the merchant 130 and enables the merchant 130 to scan or read the deal voucher to check that it is valid (that is, not expired and not fraudulent). For example, the buyer 125 can print the deal voucher 400 and take it to the Yogery Café (which is the merchant store 155). As another example, the buyer 125 can let the merchant 130 electronically scan a code that is unique to the deal voucher and is displayed on a portable electronic device (such as a smartphone) of the buyer 125. The buyer 125 (or recipient 165) can wait to use the deal voucher as long as the buyer 125 (or recipient 165) uses the deal voucher before the expiration of the deal voucher.

The online commerce system 100 incentivizes each buyer to share the deal with other people. Moreover, the system 100 is designed so that each buyer will have the same incentive throughout the open time period that the deal is offered. Thus, the first buyer to purchase the deal has the same incentive to share as the $1000^{th}$ buyer to purchase. Thus, the $1000^{th}$ buyer to purchase can still obtain the same greater discount as the first buyer to purchase as long as the $1000^{th}$ buyer shares the deal with enough other people. Thus, the online commerce system 100 maintains the incentive to share throughout the open time period that the deal is offered. The only possible diminishment to incentive to share is the nearing expiration of the open time period, but that would occur only if the open time period is made known to those who visit the deal website. That is, a buyer who buys the deal with one minute remaining in the open time period may not have any incentive to share since it is unlikely that sharing would result in a greater discount for such a late-buying buyer if the deal website provides the open time period. In some implementations, the deal website displays or provides the open time period. In other implementations, the deal website does not display or provide the open time period. Thus, the online commerce system 100 provides a persistent incentive to share the deal, and the incentive could only decline if the buyer is aware of the open time period.

The deal broker 145 need not notify the merchant 130 of the incentive and the greater discount offered to buyers who share enough deals that are subsequently purchased can be paid by the deal broker 145, not the merchant 130. The deal broker 145 gets the benefit of more people buying into the deal even though the deal broker 145 absorbs the greater discount provided to deal-sharing buyers.

Optimization

The deal recommendations between users described above reveal a social network structure that exhibits communication patterns between users. One important structural property of social networks is the degree of a user, which may be defined as the number of users someone is connected to. Numerous studies show that degree distributions often follow a power law distribution. However, monetary incentives modify this distribution. A temporal graph evolution model that mimics observed sharing patterns and allows generation of new data for the simulation of a wide range of incentive scenarios is provided by the service provider system 110 through one or more optimization processes.

The optimization processes are implemented using an optimization engine 235 of the service provider system 110. The optimization engine 235 accesses network data for a particular network (e.g., data in the databases 217, 222, 227, 232, 236, 237, and/or 242, regarding the users of the service provider system 110) and applies various graph models and/or distributions to the dataset to accurately determine likely outcomes of various incentive scenarios. Profitability associated with these scenarios may be used to generate a decision matrix. The decision matrix can be used to compare various scenarios and parameters, and to select a scenario for implementation as a deal provided by the service provider system. In addition, feedback through additional accumulated data may be used to modify the scenario based on actual performance associated with the deal. As a result, ongoing feedback may be incorporated to further refine or select a model or scenario that optimizes the broker's profits or increases the broker's profits to a an acceptable threshold level.

According to the methods and systems provided herein, sharing incentives are offered to all users of the service provider system. Although the system offers the incentives to all users, generally it is the early adopters who recommend well that are able to take advantage of the incentive. As a result, the service provider system implements a mass viral marketing system (versus a directed one). In contrast, the goal of many direct viral marketing campaigns is to incentivize a subset of individuals to adopt a product, with the hope that the few influence others to do the same.

In following examples, let G=( U, D, P, S) refer to a graph, where u∈ U refers to the set of users, d∈ D is the set of items or deals that can be purchased, P=U×D are the purchases of a deal by a user and S=( U×U×D) is the deal shares (or recommendations) between users. Each user can be a sender or a recipient of a shared recommendation, and the three-tuple s is ordered in terms of the 1) the share sender or origin of the share o, 2) the recipient r of a deal d, and the deal d that is shared. As users send deals to other network users and outside users, a directed social network is formed. The set of recipients of a share is defined as R(o, d)={r: ( o, r, d) ∈S}. In addition, the share outdegree (the number of recipients with whom sender o shared deal d), is defined as outdegree(o, d)=|R(o, d)|.

In addition, every user has a set of properties, such as their arrival time into the network or purchasing preferences, as discussed in more detail below.

Lastly, every incentive i may be defined by at least two properties, such as, for example: a goal (i.e., an objective that a sharer has to reach) and a reward (i.e., the benefit to the sharer if he reaches the goal). The $cost_{u,d}(i)$ is the incentive cost to the broker when a sharer u who bought deal d achieves the incentive goal and must be given the reward.

There are two other types of entities besides users: the deal broker c, which sells the deals through the website of the service provider system, and the merchant m, which provides the services or products that are featured in the deal. Each deal has an associated price, and the deal broker and merchant agree on the deal profit margin (i.e., a proportion of the deal price) that the broker keeps, which is the revenue_d for the broker of the deal d. Therefore, a set of properties associated with every deal d includes properties such as: price, $price_d$, and a profit margin, margins (i.e., a percentage of the deal price that the broker keeps).

One goal of the optimization provided by the optimization engine is to attempt to maximize the profit for any particular deal scenario. Therefore, in one example, given a set of incentives I, an incentive i* maximizes profits if and only if:

$$i^* = \max_i \sum_{d \subset D} \sum_{u \in u(d,i)} \left[ profit_{u,d}(i) \right]$$

where D is the set of deals, u(d, i) is the set of users who purchased the deal d under the incentive i, and $$profit_{u,d}(i) = \begin{cases} -cost_{u,d}(i) & \text{if } u \text{ reached } goal_i \\ margin_d \cdot price_d & \text{else} \end{cases}$$

Choosing an incentive that maximizes profit directly is not straightforward. Because of this, the service provider system simulates the behavior of the network under various incentives to determine outcomes for i*. The optimization engine applies graph models to the dataset for a particular network scenario of the service provider system to simulate outcomes for different parameters and incentives, as outlined below. For example, in a simple scenario where the profit margin is 1 (meaning the merchant gets nothing, an unlikely scenario), the profit when a user obtains the free deal is simply 0, as the broker gives the free deal at no cost. Conversely, if the profit margin is 0.5 and the user obtains a free deal, then not only is profit margin lost, but the merchant must also be reimbursed their portion of the deal price. Thus, the system seeks to effectively balance the costs between incentivizing the users with the gains from the incentivization.

Network Modeling:

A network resulting from incentivized sharing differs from one of non-incentivized shares. Sharing in a network may be altruistic, meaning it has no monetary incentive, or incentivized. Altruistic sharing distributions follow a power law distribution. Users who share before purchasing a deal are sharing because the receiving party might be interested in the deal and are referred to as non-incentivized shares. If a share occurs after a purchase of a deal, then these post-purchase shares are incentivized. Within such a network a large number of senders share with a handful of recipients and far fewer senders that share with a large number of recipients. However, with the examples described herein, the sharing network as compared to other networks has a sharper or steeper distribution. The majority of conventional social networks typically have a power law exponent alpha where 2≤alpha≤3; in contrast, the exponent for the networks described herein are considerably higher (e.g., 3.5). This indicates users send deals to subsets of their friends rather than everyone they know.

Figure 12A:
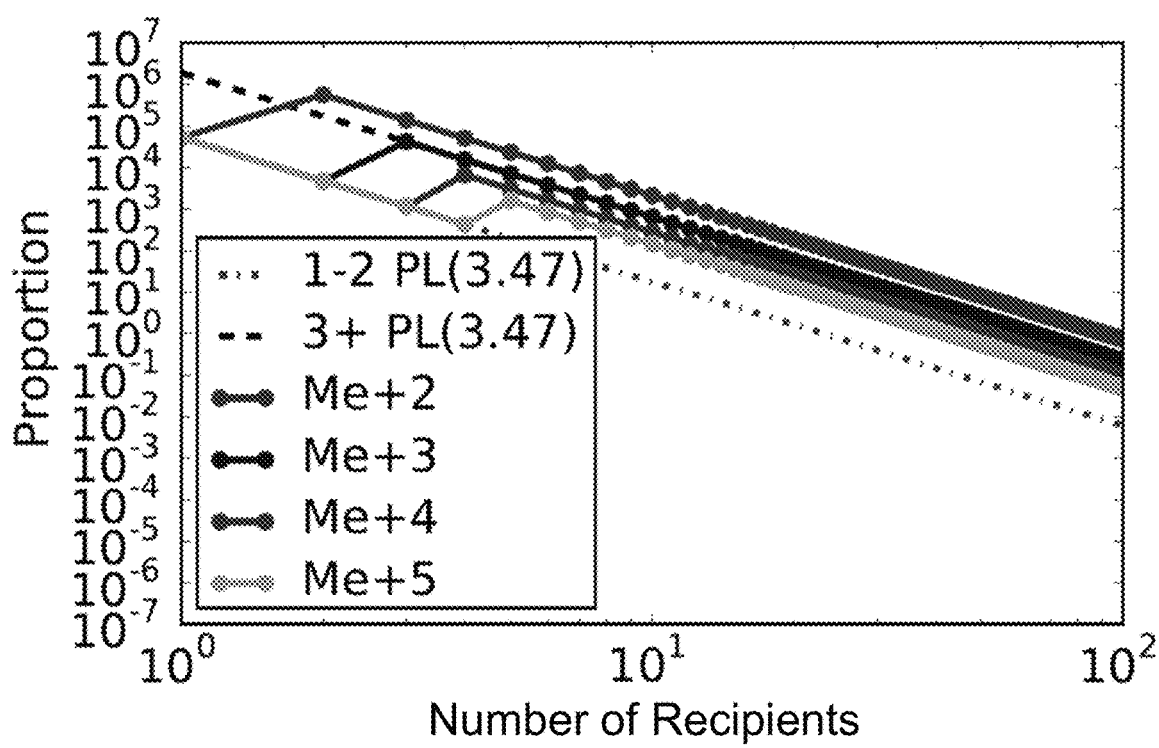
FIGS. 12a-12g show examples of distribution graphs used by the modeling and optimization processes.
Figure 12B:
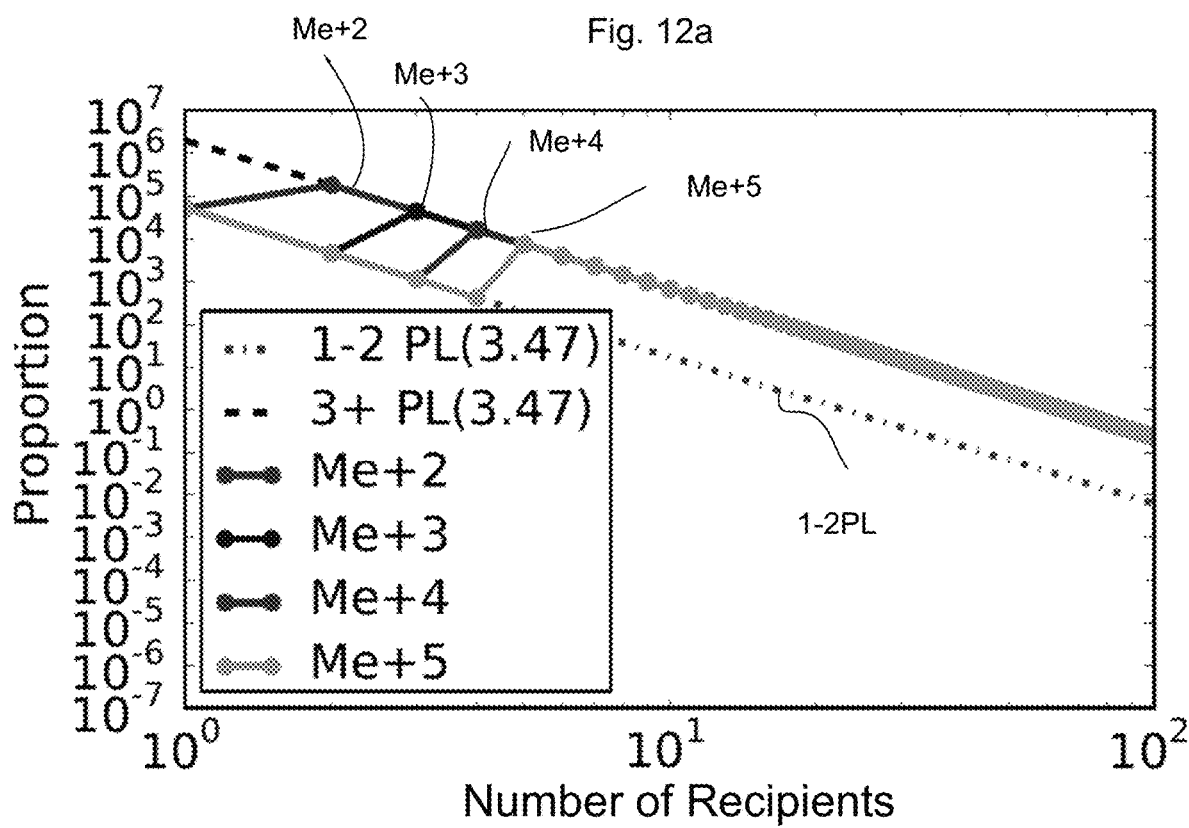

An example of an incentivized sharing distribution for Me+N is shown in FIGS. 12a and 12b. The power law distribution beginning at the incentivization N has nearly the same exponent as found in the non-incentivized case (i.e., less than N), both having an exponent around, for example, 3.5. Thus, the distribution of incentivized users has been shifted, resulting in approximately the same distribution, the only difference being that the distribution has added approximately 2 shares to every point. Those who share with less than the number needed to receive a reward (outdegree ∈<N) clearly have an altruistic reason to share because they do not try to reach the incentive of Me+N, users who share with N or more recipients (outdegree≥N) can reach the incentive even if this was not their primary reason for sharing. Incentivizing users has a large increase in the volume of shares. In addition, an increase volume of shares occurs with incentivization versus no incentivization. As a result, the incentive drives a significant amount of additional share volume.

As the buyer increases the number of recipients (i.e., outdegree), the buyer becomes less discriminating choosing good recipients; and, on average, the recipients are less likely to purchase the shared deal. That is, buyers with larger numbers of deal recipients become less discriminative in choosing which people receive a deal as they increase the number of people they share the deal with. As a result, a (truncated) $\chi^2$ distribution indicates the probability of a recipient's purchase.

While the goal of sharing incentives is to convince recipients to make a purchase, a subset of users needs to make an initial deal purchase before the deal can be shared. Therefore, two processes are used to categorize various users: user arrival and user awakening. User arrivals to the network are users who have never purchased from network previously, but for a particular deal, on a particular day, they have enough interest in the offered deal to sign up for the service and purchase the deal. In contrast, other purchases (without being the recipient of a share) are referred to as "awakenings." New user arrivals are very important to the service provider system, as they provide a large base of users who can be contacted directly regarding product offerings by the service provider system. A broker that can offer a large visibility for the deals is also more attractive to merchants who want their deal to be featured on the service provider system.

Figure 12C:
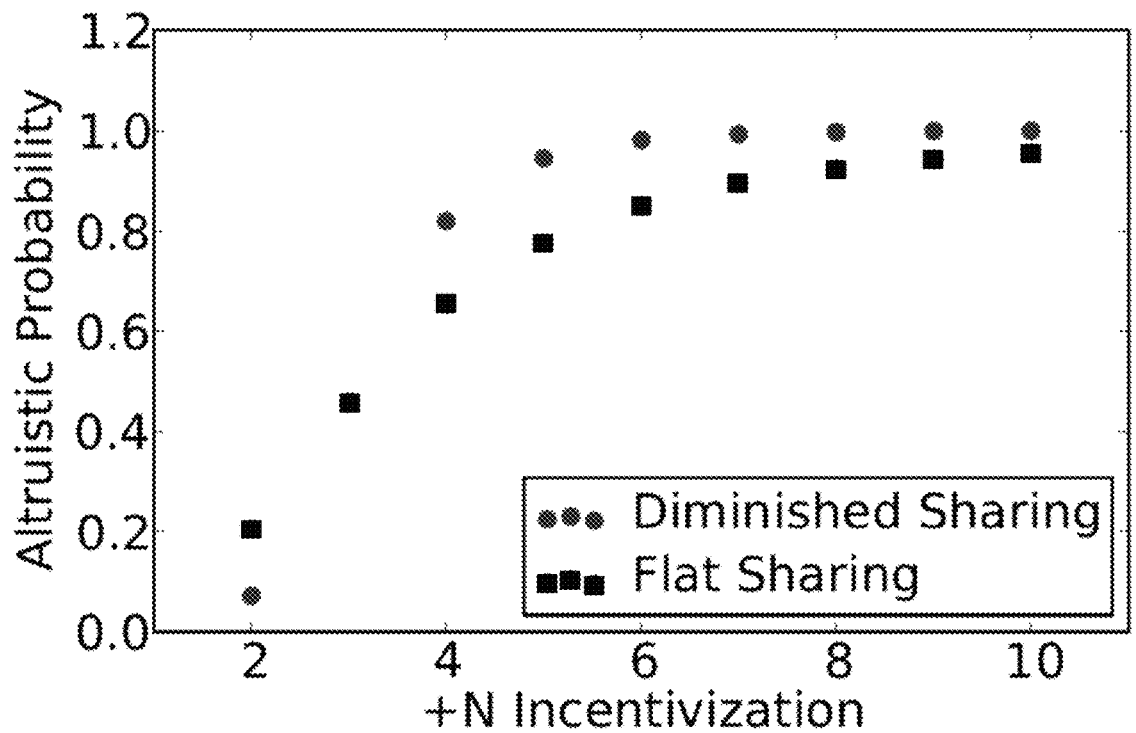
Figure 12D:
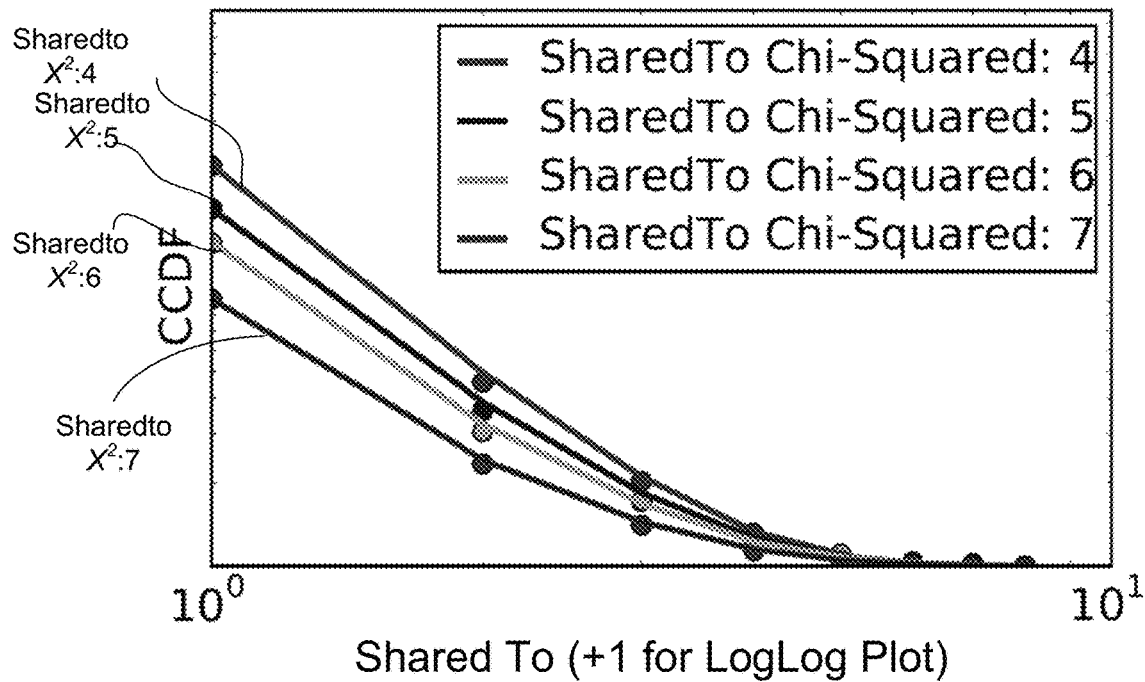
Figure 12E:
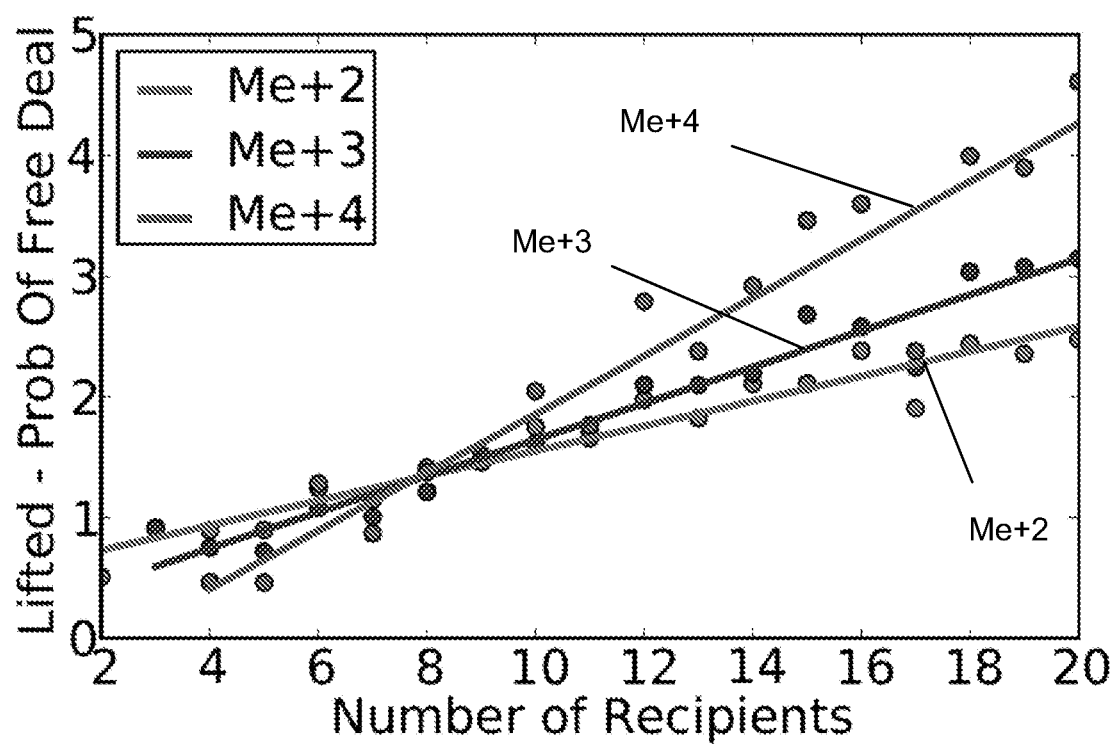
Figure 12F:
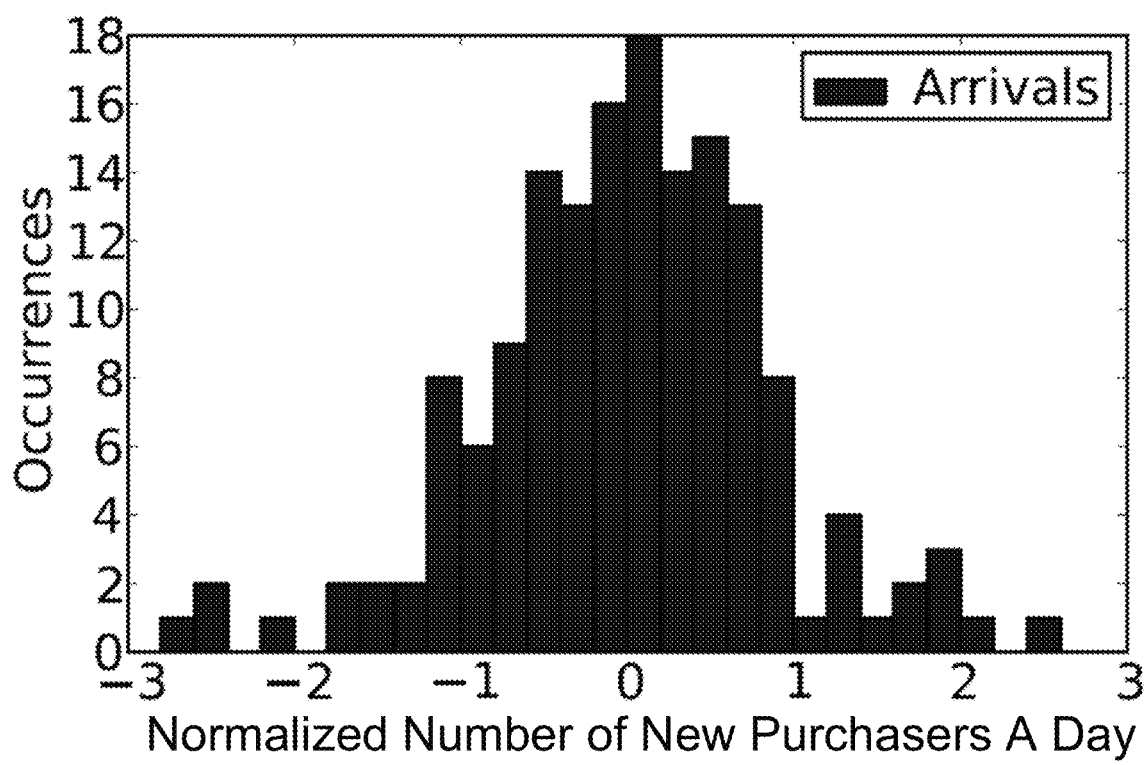
Figure 12G:
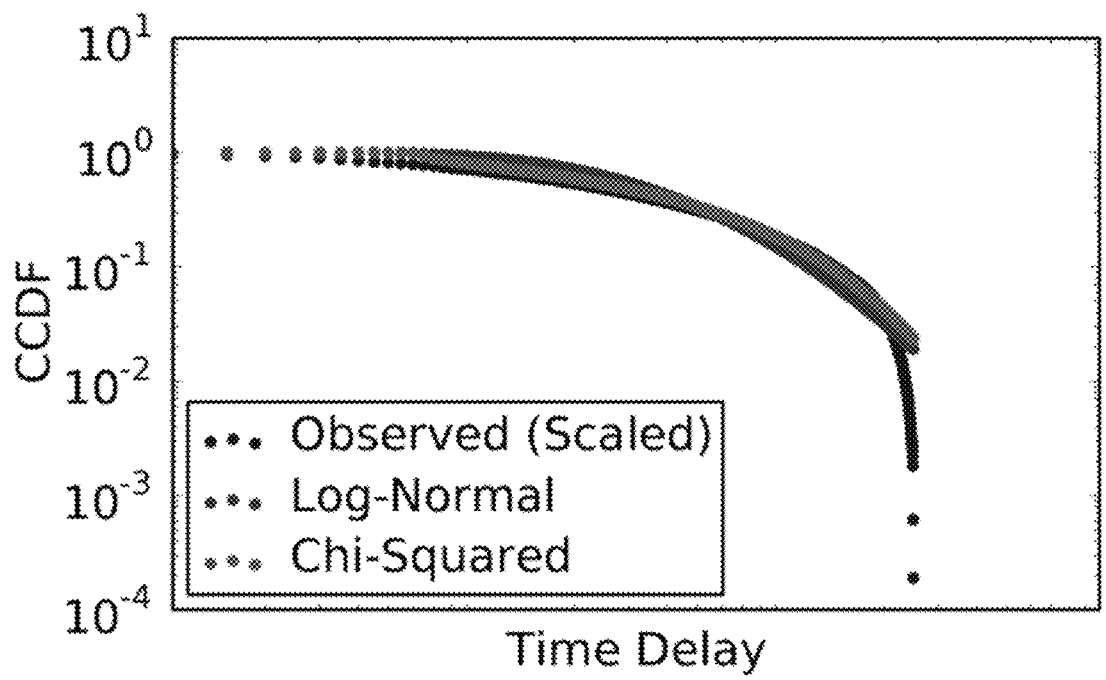

The duration between purchases of a user is defined as sleeping. Having a short period of time between user purchases is also important to deal the sharing websites, as frequent purchases per user keep a user engaged and can drive larger volume of sales. An example of an arrival distribution is shown in FIG. 12f, and an awakening distribution is shown in FIG. 12g.

Optimization Processes

While incentivized sharing through incentivized programs may lead to increased profits and a greater volume of shares than in the non-incentivized case, it is difficult to gauge how different incentive scenarios affect the broker's profits. For example, although sharing is generally considered positive for a social network (i.e., since sharing gives greater exposure to the website and increases the number of purchases), if the majority of senders achieve a free deal while very few recipients purchase an offer, revenue can suffer despite the overall increase in volume of transactions. Therefore, the system and methods described herein implement a formal graph model to simulate the behavior of users and determine which scenarios a broker network should implement to maximize or optimize revenue. Accordingly, a generalized graph model is implemented that rewards users if N of their friends buy their shared deal (i.e., Me+N). The model is designed to be modular, in order to test and compare different scenarios with respect to incentivized sharing. Thus, the model may use different statistics corresponding to the user behavior of a company interested in putting monetary incentives in place.

Figure 13:
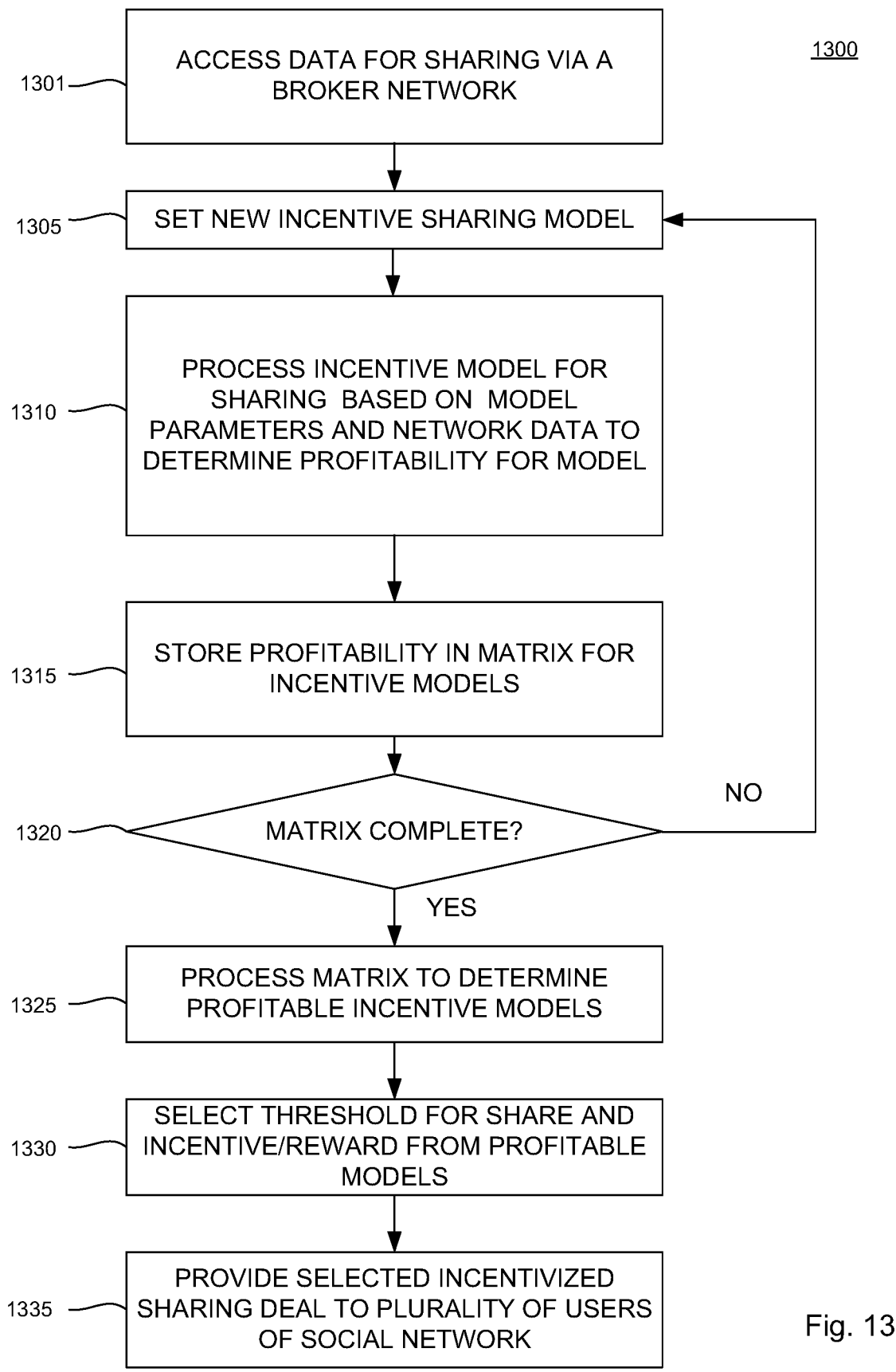
FIG. 13 is a flow chart of an example of an optimization process for the systems offering incentivized deals for a social network of the system of FIGS. 1 and 2.
Figure 14:
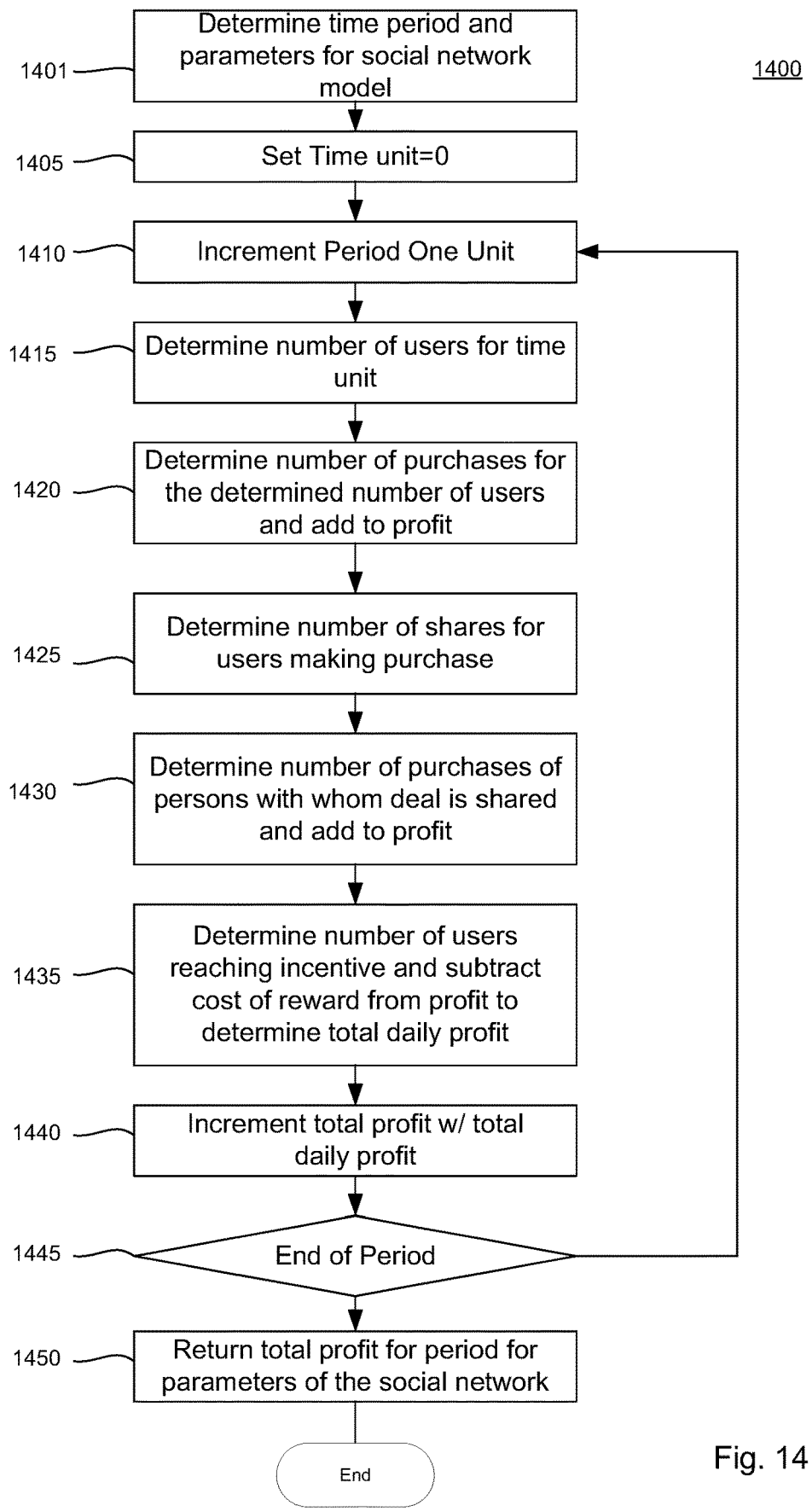
FIG. 14 is a flow chart of an example of a modeling process for the optimization process of FIG. 13.

An optimization process implemented by the optimization engine of the service provider system is shown in FIGS. 13 and 14. FIG. 13 shows one example 1300 of an optimization process. FIG. 14 shows one example 1400 of a modeling process that is used in the optimization process of FIG. 13. The processes may be adapted to any model and dataset simply by changing the input parameters and datasets. As a result, the processes are versatile and able to provide simulations for modeling any number of different incentivization scenarios.

As shown in FIG. 13, the optimization engine 235 accesses data for sharing via a broker network, for example, from a database, such as 236, 237 (1301). The optimization engine 235 selects a particular incentive sharing scenario or model for processing (1305). The optimization engine 235 processes incentive model for sharing based on model parameters and network data to determine profitability for model using various distributions to model the incentive behavior for any particular dataset (1310). The optimization engine 235 stores the determined profitability in a particular slot of matrix for the incentive models corresponding to the dataset just processed (1315). The optimization engine 235 determines whether all datasets have been processed and the matrix completed (1320). After the matrix has been completed, the optimization engine 235 processes the matrix to determine profitable incentive models from the processed scenarios (1325). The optimization engine 235 may be configured to provide selection of a threshold for sharing and an incentive/reward from one profitable model to be implemented by the system service provider 110 (1330). The system service provider 110 provides the selected incentivized sharing deal to a plurality of users of social network (1335).

FIG. 14 shows one example 1400 of a modeling process that is used in the optimization process of FIG. 13. For example, the process shown in FIG. 14 may be used to implement the processing of 1310 in the process of FIG. 13. The process 1400 is used by the optimization engine 235 to processes a particular incentive model for sharing based on model parameters and network data to determine profitability for the model for a designated time period (e.g., a week, a month, a quarter, a year, among others) and dataset.

First, the time period and parameters for the network model are determined and loaded from the accessed network data and via an interface provided to a broker (1401). The time unit is set to zero (1405). The time period (e.g., a day) is incremented one unit (1410). The number of users is determined for the time unit (1415). The number of purchases for the determined number of users is determined and added to the profit (1420). The number of shares for users making purchase is determined (1425). The number of purchases of persons with whom deal is shared is determined and added to the profit (1430). The number of users reaching the incentive is determined and the cost of the achieved reward is subtracted from the profit to determine the total daily profit (1435). The total profit is incremented by the determined total daily profit (1440) and it is determined whether the end of period is reached (1445). If not, the process 1410-1440 is repeated for the next time unit (e.g., the next day in the time period). After all time units have been processed, the total profit for the time period is returned for the selected parameters of the broker network (1450).

Examples of the various functions and distributions that may be used by optimization engine and service provider system to implement the processing 1405-1440 are shown in the following table:

| Notation | Desription |
| --- | --- |
| R(o, d) | The set recipients for a deal d shared with them by sender o |
| θ | The parameters needed by the sharing graph model. |
| Arr(θ) | The arrival function-how do new nodes enter our network? |
| Awk(θ) | The awaken function-how do existing noddes decide to make a purchase? |
| Incen(θ) | The sharing function-is the user incentivized? |
| Share($u_i$, θ) | The sharing function-how many nodes does a purchaser share with? |
| RPrch($u_i$, θ) | The recipient purchasing function. |
| Cost($r_p$, θ) | The cost function |

The following is one example of a routine that may be used to implement the processes of FIG. 14:
1: #Initialize
2: nodes=[ ], purchases=[ ], incent=[ ]
3: profit=0
4: #Run simulation for some period of time
5: for all day in days do
6: activatednodes=Arr(θ)
7: for all node in activatednodes do
8: incent[node]=Incen(θ)
9: end for
10: #Awaken the nodes for the day
11: awakenednodes=Awk(θ)
12: dailynodes=activatednodes+awakenednodes
13: profit+=θ·purchase_profit*len(dailynodes)
14: #Determine all sharing for the day
15: sp, sl=Sharing(dailynodes, incent, day, θ)
16: profit+=sp
17: profit-=sl
18: end for
19: return profit The following is one example of a second routine that may be used to implement the determination of the sharing for the day in the first routine:
1: #Initialize
2: profit=0, loss=0, purchase=[ ]
3: #Determine sharing for each node
4: for all node in dailynodes do
5: r=Share(incent[node], θ)
6: #Store purchases from shared
7: $r_p$=RPrch(r, θ)
8: profit+=θ·purchase_profit*len($r_p$)
9: loss+=Cost($r_p$, θ)
10: end for
11: return profit, loss For simplicity, as well as generalization to other datasets, all parameters for the routines are provided in dataset θ where they are accessed by any function of the routine that needs them. As explained above, the model is a temporal generator of data. The functions implementing the model are explicitly modular, meaning the statistics can be mined or postulated for a given dataset and swapped, allowing comparison for differing behaviors of any desired scenario. The main loop of the first routine (e.g., lines 5-19 loopstart through loopend) captures the daily behavior of users in the model. More precisely, the loop codifies 1) the behavior of users within the social network as deals are presented to them, 2) how they choose to share those deals, and 3) how those shares result in additional purchases.

Within the main loop, the daily behavior of the model has a number of factors: Arrival; Sleeping; Sharing; Recipient Purchasing, and Profits. Arrival indicates how new users join the network (i.e., when they make their first purchase). Sleeping and Awakening indicate the period between purchases. Sharing indicates what drives the sharing behavior of users. Recipient Purchasing indicates how recipients choose to purchase the shared deal. Profits indicate how purchases and the incentives affect the overall profits.

Arrival and Awakening Functions

The Arrival and Awaken properties, which were discussed above, are explicitly incorporated in the model (e.g., lines 6 and 11 of the first routine). The arrival and awakened users are users that choose to buy from the website on a particular day of their own accord. A variety of functions may be used for the arrival function Arr. One example of the arrival function is a function with a constant arrival sequence:

$$Arr(θ)=θ·X$$

where θ·X is a non-negative integer representing a constant daily number of users who join the website service and make their first purchase. Of course, alternative arrival functions may be used. Another function may be used to model when the arrival is a random variable from a distribution. For example, arrival functions in social networks can vary from exponential to sub-linear growth. In addition, Gaussian or the Poisson also may be used to model arrival rates, for example:

$$Arr(\theta)=round(N(\theta \cdot \mu, \theta \cdot \sigma))$$

$$Arr(\theta)=poisson(\theta \cdot \lambda)$$

Another alternative may be used to provide for seasonal effects on the arrival function, such as the distribution of particular days of the week or months of the year. For example, many retail goods experience greater volume of sales surrounding December, as compared to other months. Therefore, such an arrival function can be modeled as:

$$Arr(\theta)=round(N(\theta \cdot \mu_{\theta \cdot d}, \theta \cdot \sigma_{\theta \cdot d}))$$

where θ·d represents the day of the week, month of year, or any other relevant time-dependent distributional change.

One example of the awaken function is Awk:

$$Awk(\theta)=\theta \cdot d + x^2(\theta \cdot k)$$

The awaken function need not take into account the delay between purchases as its primary decision. In another example, an alternative awaken function may determine whether a user is likely to awaken and purchase a deal based on the likelihood of a user purchasing the offered deal:

$$Awk(u,d,\theta)=P(u|d,\theta)$$

Such a model is useful when users purchasing behaviors can be fit to a preference model, that is, users choose deals to purchase based on their own intrinsic interests. Preference models have been shown to have predictive power on the purchasing patterns of deal sharing sites.

In order to compare and contrast between sharing distributions that can be created by various scenarios, the model takes into account how the incentive affects the sharing behavior of users. Modifications of the incentive threshold, N, in Me+N results in a distribution shift for the incentivized shares while leaving the exponent intact (the shift can be characterized as a constant), as shown in FIGS. 12a and 12b. There also may be deal parameters that can change the volume of additional shares, such as deal price and deal popularity. As a result, these also may be accounted for in the model. In addition, as N increases, the additional amount of incentivized shares at any given outdegree decreases, and the altruistic share proportion increases.

It is also important to determine which users share because of the incentive and which ones share in an altruistic manner, so that the incentivized sharing distributions can be generated. An example of altruistic sharing probabilities is shown in FIG. 12c. Two basic implementations use these probabilities that create the correct sharing distribution; however, others can be used. In one example, a method assumes a fixed motivation for each user; that is, every user who joins the network is either altruistic by nature or only responds to incentives. The variable, incent[node] is then stored and used when the user initiates a deal sharing. To determine the number of share recipients, recip, a number is drawn from a power law distribution. Should the user be incentivized, then N−1 is added to the number drawn, otherwise the same value is used. Thus, users who respond to incentives are drawn from a power law with a minimum value N, while altruistic values are drawn from the power law with a minimum value of 1.

$$Incen(\theta)=Ber(\theta \cdot p)$$

$$Share(\theta)=PL(\theta \cdot cx)+1[\theta \cdot b] \cdot (\theta \cdot N-1)$$

As an alternative, a user can change whether they are incentivized per deal, ignoring their past sharing behavior. For example:

$$Share(\theta)=PL(\theta \cdot cx)+Ber[\theta \cdot p] \cdot (\theta \cdot N-1)$$

Other possibilities can assign a probability of repeating their previous value, or switching. Letting θ·q be the probability the user keeps the same incentivization behavior, provides:

$$Share(\theta)=PL(\theta \cdot cx)+Ber(\theta \cdot q)^{\theta \cdot b} \cdot (\theta \cdot N-1)$$

Such behavior can be useful for modeling accurate incentive behaviors for the users as they change over time.

Another important function in the model is the number of successful purchase recommendations given the number of recipients. That is, if the sender shares a deal with four other people, what is the probability no one will purchase the deal, one person will purchase the deal, two people will purchase the deal, and so on. FIG. 12d shows an example of the purchase probability distributions for sender-deal shares with 4, 5, 6 and 7 recipients. These distributions are best described by a $\chi^2$ distribution, however, the distribution is truncated for values greater than the number of shares (since there cannot be more purchasers of the deal than were shared with). Accordingly:

$$RPrch(\theta)=truncated(x^2(\theta \cdot k), \theta \cdot s)$$

where θ·s is the outdegree of the sender-deal pair, and θ·k is the parameter to the truncated $\chi^2$ distribution.

As seen in FIG. 12a, the probability of a recipient purchasing a deal noticeably decreases as the outdegree of the sender-deal pair increases. Furthermore, FIG. 12b shows that despite the overall purchase probability decreasing, the probability of the sender acquiring a free deal increased as the outdegree increased. However, generally, the purchase probabilities for the recipients are invariant with respect to the incentive. A plot of the lift probabilities of free deals for a variety of N values can be characterized as:

$$Lift(s, \theta) = \frac{P(free\_deal \mid s, \theta)}{P(free\_deal \mid \theta)}$$

That is, what is the ratio of the free deal probability given a certain number of shared against the total free deal probability. This is shown in FIG. 12e. Thus, while it is likely that certain users plan to buy a deal without using the broker interface, these users are small in comparison to overall body of users.

In addition, the free deal probabilities have a general upward trend for each of the N values. While not exhaustive, having a consistent behavior for each of the varying N values implies that the free deal probabilities are independent of N.

Sharing incentives naturally result in a variety of costs to the broker. The simplest example is where the deal is given out freely to the user, and the reward cost is equal to the deal price. The sharing cost function is Cost(rp, θ), where $r_p$ is the number of recipients who purchased a deal recommended to them by a sender, and θ is the set of parameters, such as the incentive threshold or the number of purchasers who must buy a deal in order for the sender to receive the reward. More formally, the cost function for the reward function described above can be defined as:

$$Cost(r_p, \theta) = II[\|r_p\| \geq \theta \cdot N] \cdot \$\theta \cdot reward$$

where II is the indicator and θ·N is the incentive threshold. As an alternative cost function, a fixed cost function may be used. In this model, the reward is not related to the price of the deal or the merchant percentage. Such an incentive has a reward of a constant amount, for example:

$$Cost(r_p, \theta) = \Pi[\|r_p\| \geq \theta \cdot N] \cdot \$10$$

Fore example, such a method is used by the refer-a-friend program by Bloomspot, Fab, and LivingSocial for new user acquisition.

Accordingly, the above described functions for arrivals, awakened users, incentives, sharing, recipient purchasing, and cost are used to model a sharing scenario for a set of parameters. These scenarios are then compared to determine optimal candidates for actual implementation and refinement.

Simulated Examples

The flowing section provides some examples for illustration of the models given above. In the following example, comparisons are made that vary 1) the incentive threshold value, N, of the Me+N, and 2) the sharing distributions under various starting conditions for the models. The models are compared by examining which model consistently outperforms the others in terms of profits.

For example, assume a constant deal price of $50, an arrival function of 10000 new users per day, with a $X^2(50)$ awakening distribution, the profit margin set to 50%, and the reward fixed to be equal to the deal price. In these examples, 300 deals/day are simulated 50 times for each model. Also assume for simplicity of illustration that the distributions are price-invariant (although modeling can be set to adjust for price effects of both share volume and structure). Two models (Diminished and Flat) of projected sharing behavior for the other +N cases as outlined above and shown in FIGS. 12a-e are created. As shown in FIGS. 15a-c, "Diminished" is denoted as when the incentivized sharing converges to the non-incentivized sharing, and "Flat" denotes when it does not. According to the following examples, one or more of these assumptions are varied to provide comparison between differing scenarios.

In a first example, a cost model is used to represent a scenario when the broker receives a portion of the deal price with the remainder provided to the merchant offering the service. Under such a model, the service provider system and broker must reimburse the merchant for their portion of a deal cost when a customer achieves a free deal. Thus, when a profit margin is high, or the broker receives nearly the entire deal cost, the model performs similarly as in the case where the broker receives the entire profit. Conversely, when the profit margin is low, the merchant receives the majority of the deal cost, resulting in a free deal having a large impact on the broker's revenues.

FIGS. 15a, 15b, and 15c illustrate the results when the percentage of the profits the broker receives is varied. When the profit margin is high as shown in FIG. 15a, performance is generally better as the volume of shares increases. The exception is in the Me+2 case, which is discussed below. Aside from that case, the 'Flat' sharing distribution generally acts as an upper bound to performance, while the 'Diminished' functions as a lower bound. As the profit margin decreases, a higher penalty is incurred for giving away the deal. FIG. 15c shows that as the profit margin goes to 0, the broker loses more money from free deals than it gains from the additional purchases. In this situation, it becomes more profitable to omit any incentivization. In one scenario, using a 50% profit margin shown in FIG. 15b, the Me+3 outperforms the Me+4 and Me+5. FIG. 15d shows the performance when the reward given back to the individual is limited to 20% of the deal price.

One point of interest illustrated by FIGS. 15a-c is that the behavior of the Diminished and Flat models are very similar across the profit margins in terms of performance despite the change in the volume of shares. FIGS. 16a and 16b further illustrate this showing what happens when the profit margin is fixed at 50%, and the percentage of incentivized users is varied from 30% to 100%. In the Me+3 case, there is a steady, linear increase in the profits received based on the percentage of users which have been incentivized. However, in the Me+2 case, there is little to no increase in profits as the volume of incentivized users is increased, despite the fact that share volume increases considerably. As such, the Me+2 case is in an equilibrium state. The penalty from the ease of attaining the reward outweighs the additional purchases from the additional shares received.

FIG. 16c examines the profits as both the reward (as a percentage of price) and number of incentivized users linearly increase, starting with a reward of 20% of the price coupled with 10% of users being incentivized. As both percentages are increased, Me+3 increases as well. This shows that the overall gain from the additional shares outweighs the negative impact of the additional cost of the reward. However, with Me+2 the opposite is true. In this case, as the reward increases, a decrease in profitability is shown as the additional incentive cost outweighs any additional purchases. FIG. 16d shows effects with the increase in shares.

In the previous examples, the incentive cost typically outweighed the benefit of the Me+2 sharing incentivization. However, there is a scenario where Me+2 can perform equally well as the Me+3; namely, when the incentive cost is low, the additional volume of shares can overpower the loss as illustrated in FIG. 15d. FIG. 15d shows the reward offered to the user to be 20% of the deal price. In this scenario, Me+2 performs comparably, or better, than Me+3. As such, when the reward offered to the users is low in comparison to the deal profit, a more aggressive incentive scheme should be used. Additionally, this model assumes fixed sharing distributions; should the sharing behavior change dramatically as the incentive amount changes these results may change.

Overall, in the examples provided above, the model provides simulation of the tradeoffs between the large volume of shares, which result from a highly attractive incentive, versus the high cost of that incentive. As the merchant is able to receive a larger percentage of the deal price, the cost of having a large incentive becomes prohibitive. This is important, as users are ignorant to the background costs of running a deal sharing broker network. Furthermore, the fixed cost of a reward can become prohibitive to sharing as well. Thus, as a deal sharing network contemplates offering such an incentivized sharing model, the network should consider the profit margin received for that deal, the volume increase or decrease from the incentivization scheme, as well as the likelihood of users achieving the incentive goal.

Optimization Scenario

The following is one simple example for illustrative purposes only. For example, assume a service provider has some organic/altruistic sharing of products/services and purchases (i.e., product adoption) occurring as the result of the sharing within its network of users. In this sense, the sharing is organic as there is "no incentive" scenario implemented. The service provider would like to incentivize sharing to increase the sharing and adoption of products within its network of user; however, the service provider does not want to lose money in this process.

The service provider adopts the Me+N sharing model as described herein, which takes as input the parameters of organic sharing of the existing network to predict the effect of an incentive on profits using the model. Using the processes described above with regard to FIGS. 13 and 14, for example, the optimization engine determines the model outputs, for different projected additional shares, what the optimal incentive is and under what incentives the company is not losing money (paying more rewards than it receives in referred revenue).

For example, the process in FIG. 13 generates a matrix (for 50% profit margin):

|  | % additional shares due to incentive | | |
|---|---|---|---|
|  | 0% | 50% | 100% |
| Optimal | No incentive | Me + 3 | Me + 2 |
| Better than 'no incentive' | N/A | Me + 3, Me + 4, etc. | Me + 2, Me + 3, etc |
| Positive profit | Me + 2, Me + 3, etc. | Me + 2, Me + 3, etc. | Me + 1, Me + 2, etc. |

In this example, "Optimal" is defined as the incentive that maximizes profits including no incentive is an option. "Better than organic" is defined as the incentive scenario(s) that have higher profit than organic (i.e., revenue from additional referred purchases due to the incentive is higher than the cost paid for rewards). "Positive profit" is defined as the incentive(s) in which revenue from referred purchases (based on both organic shares and additional shares due to incentive) is higher than the cost paid for rewards.

The matrix is analyzed to consider those incentives scenarios that are always in positive profit and better than no incentive for some assumptions on the % additional shares. In the example above, Me+3 and N>3 are better than 'no incentive' in both 50% and 100% additional. One scenarios these scenarios is then selected. In addition, A/B testing may then be used to collect information on % additional sharing for each N determine where in the matrix hey actually fit. Of course, one will appreciate that this matrix is illustrative only and that more granular demarcations may be determined. For example, the % additional sharing for each N may be broken into smaller increments (e.g., 10% increments).

Further Examples

With regard to the implementations given above, it will be appreciated that the examples are illustrative, and that any number of, types of, or configurations of different components and software may be incorporated into or omitted from any particular device. For example, the user device 101 or server 205 may include a number of components including one or more of the following: one or more processing devices, one or more storage devices, and one or more communications interfaces. The devices also may include additional elements, such as one or more input devices (e.g., a display, a keyboard, a key pad, a mouse, a pointer device, a trackball, a joystick, a touch screen, microphone, etc.), one or more output devices (e.g., speakers), a display, one or more interfaces, communications buses, controllers, removable storage devices, and at least one power source. Additional elements not shown may include components of a digital camera, an optical reader (e.g., a bar code scanner or an infrared scanner), an RFID reader, and antennas/transmitters and/or transceiver. A user device also may include one or more associated peripheral devices (not shown), such as, for example, a display, a memory, a printer, an input device, an output device, and speakers. As is appreciated by those skilled in the art, any of these components (other than at least one processing device) may be included or omitted to create different configurations or types of user devices, for example, to perform specific or specialized needs or tasks, generalized needs or multiuse tasks, or for various performance criteria, such as, mobility, speed, cost, efficiency, power consumption, ease of use, among others.

A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the applications.

For purpose of simplicity, the description of a processing device is used as singular; however, one skilled in the art will appreciated that a processing device may include multiple processing elements or devices and multiple types of processing elements or devices. For example, a processing device may include multiple processors or a processor and a controller. In addition, different processing configurations are possible, such as serial processors, parallel processors, a quad processor, a main processor and a display processor or caching processor, among others. As used herein, a processing device configured to implement a function A includes a processor programmed to run specific software. In addition, a processing device configured to implement a function A, a function B, and a function C may include configurations, such as, for example, a processor configured to implement both functions A, B, and C, a first processor configured to implement function A, and a second processor configured to implement functions B and C, a first processor to implement functions A, a second processor configured to implement function B, and a third processor configured to implement function C, a first processor configured to implement functions A and B, and a second processor configured to implement function C, a first processor configured to implement functions A, B, C, and a second processor configured to implement functions A, B, and C, and so on.

The software applications may include a computer program, a piece of code, an instruction, or some combination thereof, for independently or collectively instructing or configuring the processing device to operate as desired. Examples of software applications include: an operating system, drivers to control and/or operate various components of the user device (e.g., display, communications interface, input/output devices, etc.).

In particular, an optimization engine may operate an application implement the processes in FIGS. 13 and 14 and run routines 1 and 2. In addition, applications may implement an interface, such as a browser, a mini browser, a mobile device browser, a widget, or other programs that interact with the service provider systems to provide or present content and a user interface or conduit for presenting deals from the broker. The interfaces may include, among other features, browser based tools, plug-ins, and extension applications, such as Java, Acrobat Reader, QuickTime, or Windows Media Player, and a Flash Player (e.g., Adobe or Macromedia Flash).

The applications may be resident in the processing device, loaded from a storage device, or accessed from a remote location or a storage device, as described in greater detail below. Once the applications, such as a browser, are loaded in or executed by the processing device, the processing device becomes a specific machine or apparatus configured to perform a function, such as to provide a user interface to render, present, provide, and interact with content from a content provider system. That is to say a user device with a processing device programmed in a certain way is physically different machine than that of a user device without that program as its memory elements are differently arranged and/or configured.

The software, applications, content, and data may be embodied permanently or temporarily in any type of machine, component, physical or virtual equipment, computer storage medium or device, or in a propagated signal wave capable of providing instructions or data to or being interpreted by the processing device. In particular, the software, applications, content, or data may be stored by one or more computer storage devices including volatile and non-volatile memories that store digital data (e.g., a read only memory (ROM), a random access memory (RAM), a flash memory, a floppy disk, a hard disk, a compact disk, a tape, a DROM, a flip-flop, a register, a buffer, an SRAM, a DRAM, an SSD, a PROM, a EPROM, a OPTROM, a EEPROM, a NOVRAM, or a RAMBUS, such that if the storage device is read or accessed by the processing device, the specified steps, processes, and/or instructions are performed and/or data is accessed, processed, and/or stored. The computer storage device may include an I/O interface, such that data and applications may be loaded and stored in or accessed or read from the computer storage device allowing the applications, programming, and data to be used, updated, deleted, changed, augmented, or otherwise manipulated. The computer storage device may be removable, such as, for example, a disk drive, a card, a stick, or a disk that is inserted in or removed from the user device.

A communications interface may be used to exchange data and content with the content provider system or user devices using various communication paths 115. The communications interface may be implemented as part of the processing device or separately to allow the processing device to communicate or send and receive data using the communication paths 115. The communications interface may include two or more types of interfaces, including interfaces for different types of hardware and/or software to interact with different types of communications media and protocols and to translate information/data into a format that may be used by the processing device. Similarly, the interface may translate information/data received from the processing device to a format that may be transmitted to the service provider system via a communication path.

The communication paths 115 may be configured to send and receive signals (e.g., electrical, acoustic, electromagnetic, or optical) that convey or carry data representing various types of analog and/or digital data including programming, software, media, and content, among others, for presentation to a user. For example, the communication paths may be implemented using various communications media and one or more networks comprising one or more network devices (e.g., network interface cards, fiber media converter, servers, routers, switches, hubs, bridges, repeaters, blades, processors, and storage devices). The one or more networks may include a local area network (LAN), a wide area network (WAN), an Ethernet, a global area network (GAN), a cloud network, a plain old telephone service (POTS) network, a digital subscriber line (DSL) network, an integrated services digital network (ISDN), a synchronous optical network (SONNET)/SDH, Passive and Active Optical Networks (PON or AON), a packet switched network, V.92 telephone network modems, IRDA, USB, Firewire, EIA RS-232, EIA-422, EIA-423, RS-449, RS-485, ITU, T1 and other T-carrier links, and E1 and other E-carrier links, varieties of 802.11, GSM Um radio interface, Bluetooth, IEEE 802.11x Wi-Fi, TransferJet, Etherloop, ARINC 818 Avionics Digital Video Bus, G.hn/G.9960, or a combination of two or more of these networks to name a few.

In addition, the communication paths may include one or more wireless links (e.g., microwave, radio, and satellite) that transmit and receive electromagnetic signals, such as, for example, radio frequency, infrared, and microwave signals, to convey information/data signal using any one of a number of communications protocols, for example, communications links may include IMT-2000, such as 2G (GSM, GPRS, EDGE, EDGE Evolution, CSD, HSCSD), 2.5G, 2.75G, 3G (W-CDMA, HSPDA, HSUPA, UMTS-TDD, FOMA), 4G, and IEEE 802.11 standards, such as Wi-Fi or WLAN. In one example, a communication path may include the Internet or World Wide Web or components found therein.

Data and content may be exchanged between the service provider system 110 and the user device 101 through the communication interface and communication paths using any one of a number of communications protocols. In particular, data may be exchanged using a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose the Internet Protocol defines addressing methods and structures for datagram encapsulation. Of course other protocols also may be used. Examples of an Internet protocol include Internet Protocol Version 4 (IPv4) and Internet Protocol Version 6 (IPv6).

A number of exemplary implementations have been described. Nevertheless, it will be understood that various modifications may be made. For example, suitable results may be achieved if the steps of described techniques are performed in a different order and/or if components in a described components, architecture, or devices are combined in a different manner and/or replaced or supplemented by other components. Accordingly, other implementations are within the scope of the following claims.

The invention claimed is:

1. A method comprising:

receiving a request to generate an incentivized sharing deal for one or more products or services provided by a merchant, wherein the incentivized sharing deal comprises a deal in which a first user purchases a particular deal, shares the particular deal, and subsequently, upon sharing the particular deal with a threshold number of other users, including a second user, who also purchase the particular deal, receives an incentive, and in which the second user purchases the particular deal, shares the particular deal, and subsequently, upon sharing the particular deal with the threshold number of other users who also purchase the particular deal, receives the incentive;

simulating, by a processor, each of a plurality of potential outcomes of one or more incentive scenarios that follow the purchase of the particular deal by the first user, the one or more incentive scenarios each indicative of one of a plurality of values for the threshold number of the other users, the threshold number of the other users being a number of other users that must purchase the particular deal for the first user to receive the incentive, wherein each function implementing the simulating is explicitly modular, enabling statistics to be mined or postulated for a given dataset and swapped, allowing comparison for differing behaviors of any desired scenario;

determining, based on a first set of parameters, the threshold number of other users that are required to optimize a relationship between at least two additional parameters; and providing, over a network, the incentive sharing deal, the incentivized sharing deal comprised of the particular deal and an indication of a threshold number of users that upon sharing the particular deal with, results in reception of the incentive.

2. The method of claim 1, wherein the at least two additional parameters comprise a profit margin from the incentivized sharing deal and a volume of sales for the incentivized sharing deal.

3. The method of claim 1, wherein the determining of the threshold number of other users that are required to optimize the relationship between at least two additional parameters comprises:

receiving a portion of the first set of parameters, including a time period; setting a time unit to zero; incrementing the time period one time unit; determining a number of users for the time unit; determining a number of purchases for the determined number of users; adding to a time unit profit value; determining a number of shares for users making a purchase is determined; determining the number of purchases of persons with whom deal is shared; adding to the time unit profit value; determining the number of users reaching the incentive; subtracting a cost of the incentive from the time unit profit value; determining time unit profit value for the time unit; adding time unit profit value to a total profit value; determining whether the time period is reached; if not, incrementing time unit; and repeating until time period is reached.

4. The method of claim 3, wherein one or more determining calculations utilize one or more of an arrival function, a sleeping function, an awakening function, a sharing function, a recipient purchasing function, and a profits function;

wherein the arrival function is indicative of how new users join a network and when a first purchase is made, the sleeping function is indicative of a period between purchases, the awakening function is indicative of the period between purchases, the sharing function is indicative of factors that drive sharing behavior between users, the recipient purchasing function is indicative of how recipients choose to purchase a shared deal, and the profits function is indicative of how purchases and the incentive affect overall profits.

5. The method of claim 4, wherein the arrival function is a function of time-dependent distributional change.

6. The method of claim 4, wherein the recipient purchasing function indicates a probability of a recipient purchasing a deal decreases as an outdegree of a sender-deal pair increases and despite the probability of the recipient purchasing the deal decreasing, a probability of a sender acquiring a free deal increases as the outdegree increases.

7. The method of claim 1, further comprising:

analyzing each of the plurality of potential outcomes of the one or more incentive scenarios to determine one or more incentive scenarios in which an outcome of an incentivized sharing scenario is better than organic sharing and revenue from referred purchases, based on both organic sharing and additional sharing due to the incentive, is higher than a cost paid for incentive.

8. A computer program product comprising at least one non-transitory computer-readable storage medium having computer-executable program code instructions stored therein, the computer-executable program code instructions comprising program code instructions for:

receiving a request to generate an incentivized sharing deal for one or more products or services provided by a merchant, wherein the incentivized sharing deal comprises a deal in which a first user purchases a particular deal, shares the particular deal, and subsequently, upon sharing the particular deal with a threshold number of other users, including a second user, who also purchase the particular deal, receives an incentive, and in which the second user purchases the particular deal, shares the particular deal, and subsequently, upon sharing the particular deal with the threshold number of other users who also purchase the particular deal, receives the incentive;

simulating, by a processor, each of a plurality of potential outcomes of one or more incentive scenarios that follow the purchase of the particular deal by the first user, the one or more incentive scenarios each indicative of one of a plurality of values for the threshold number of the other users, the threshold number of the other users being a number of other users that must purchase the particular deal for the first user to receive the incentive, wherein each function implementing the simulating is explicitly modular, enabling statistics to be mined or postulated for a given dataset and swapped, allowing comparison for differing behaviors of any desired scenario;

determining, based on a first set of parameters, the threshold number of other users that are required to optimize a relationship between at least two additional parameters; and providing, over a network, the incentive sharing deal, the incentivized sharing deal comprised of the particular deal and an indication of a threshold number of users that upon sharing the particular deal with, results in reception of the incentive.

9. The computer program product according to claim 8, wherein the at least two additional parameters comprise a profit margin from the incentivized sharing deal and a volume of sales for the incentivized sharing deal.

10. The computer program product according to claim 8, wherein the determining of the threshold number of other users that are required to optimize the relationship between at least two additional parameters comprises:

receiving a portion of the first set of parameters, including a time period; setting a time unit to zero; incrementing the time period one time unit; determining a number of users for the time unit; determining a number of purchases for the determined number of users; adding to a time unit profit value; determining a number of shares for users making a purchase is determined;

determining the number of purchases of persons with whom deal is shared; adding to the time unit profit value; determining the number of users reaching the incentive; subtracting a cost of the incentive from the time unit profit value; determining time unit profit value for the time unit; adding time unit profit value to a total profit value; determining whether the time period is reached; if not, incrementing time unit; and repeating until time period is reached.

11. The computer program product according to claim 10, wherein one or more determining calculations utilize one or more of an arrival function, a sleeping function, an awakening function, a sharing function, a recipient purchasing function, and a profits function;
   wherein the arrival function is indicative of how new users join a network and when a first purchase is made, the sleeping function is indicative of a period between purchases, the awakening function is indicative of the period between purchases, the sharing function is indicative of factors that drive sharing behavior between users, the recipient purchasing function is indicative of how recipients choose to purchase a shared deal, and the profits function is indicative of how purchases and the incentive affect overall profits.

12. The computer program product according to claim 11, wherein the arrival function is a function of time-dependent distributional change.

13. The computer program product according to claim 11, wherein the recipient purchasing function indicates a probability of a recipient purchasing a deal decreases as an outdegree of a sender-deal pair increases and despite the probability of the recipient purchasing the deal decreasing, a probability of a sender acquiring a free deal increases as the outdegree increases.

14. The computer program product according to claim 8, wherein the computer-executable program code instructions further comprise program code instructions for:
   analyzing each of the plurality of potential outcomes of the one or more incentive scenarios to determine one or more incentive scenarios in which an outcome of an incentivized sharing scenario is better than organic sharing and revenue from referred purchases, based on both organic sharing and additional sharing due to the incentive, is higher than a cost paid for incentive.

15. An apparatus comprising at least one processor and at least one memory including computer program code, the at least one memory and the computer program code configured to, with the processor, cause the apparatus to at least:
   receiving a request to generate an incentivized sharing deal for one or more products or services provided by a merchant, wherein the incentivized sharing deal comprises a deal in which a first user purchases a particular deal, shares the particular deal, and subsequently, upon sharing the particular deal with a threshold number of other users, including a second user, who also purchase the particular deal, receives an incentive, and in which the second user purchases the particular deal, shares the particular deal, and subsequently, upon sharing the particular deal with the threshold number of other users who also purchase the particular deal, receives the incentive;
   simulating, by a processor, each of a plurality of potential outcomes of one or more incentive scenarios that follow the purchase of the particular deal by the first user, the one or more incentive scenarios each indicative of one of a plurality of values for the threshold number of the other users, the threshold number of the other users being a number of other users that must purchase the particular deal for the first user to receive the incentive,
   wherein each function implementing the simulating is explicitly modular, enabling statistics to be mined or postulated for a given dataset and swapped, allowing comparison for differing behaviors of any desired scenario;
   determining, based on a first set of parameters, the threshold number of other users that are required to optimize a relationship between at least two additional parameters; and
   providing, over a network, the incentive sharing deal, the incentivized sharing deal comprised of the particular deal and an indication of a threshold number of users that upon sharing the particular deal with, results in reception of the incentive.

16. The apparatus of claim 15, wherein the at least two additional parameters comprise a profit margin from the incentivized sharing deal and a volume of sales for the incentivized sharing deal.

17. The apparatus of claim 15, wherein the determining of the threshold number of other users that are required to optimize the relationship between at least two additional parameters comprises:
   receiving a portion of the first set of parameters, including a time period; setting a time unit to zero; incrementing the time period one time unit; determining a number of users for the time unit; determining a number of purchases for the determined number of users; adding to a time unit profit value; determining a number of shares for users making a purchase is determined; determining the number of purchases of persons with whom deal is shared; adding to the time unit profit value; determining the number of users reaching the incentive; subtracting a cost of the incentive from the time unit profit value; determining time unit profit value for the time unit; adding time unit profit value to a total profit value; determining whether the time period is reached; if not, incrementing time unit; and repeating until time period is reached.

18. The apparatus of claim 17, wherein one or more determining calculations utilize one or more of an arrival function, a sleeping function, an awakening function, a sharing function, a recipient purchasing function, and a profits function;
   wherein the arrival function is indicative of how new users join a network and when a first purchase is made, the sleeping function is indicative of a period between purchases, the awakening function is indicative of the period between purchases, the sharing function is indicative of factors that drive sharing behavior between users, the recipient purchasing function is indicative of how recipients choose to purchase a shared deal, and the profits function is indicative of how purchases and the incentive affect overall profits.

19. The apparatus of claim 18, wherein the arrival function is a function of time-dependent distributional change.

20. The apparatus of claim 18, wherein the recipient purchasing function indicates a probability of a recipient purchasing a deal decreases as an outdegree of a sender-deal pair increases and despite the probability of the recipient purchasing the deal decreasing, a probability of a sender acquiring a free deal increases as the outdegree increases.

21. The apparatus of claim 15, further comprising:
   analyzing each of the plurality of potential outcomes of the one or more incentive scenarios to determine one or more incentive scenarios in which an outcome of an incentivized sharing scenario is better than organic sharing and revenue from referred purchases, based on both organic sharing and additional sharing due to the incentive, is higher than a cost paid for incentive.

* * * * *